(12) United States Patent
Cho

(10) Patent No.: US 11,443,615 B2
(45) Date of Patent: Sep. 13, 2022

(54) ELECTRONIC APPARATUS AND METHOD OF CONTROLLING THE SAME

(71) Applicant: SAMSUNG ELECTRONICS CO., LTD., Suwon-si (KR)

(72) Inventor: Kyuhyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 17/084,887

(22) Filed: Oct. 30, 2020

(65) Prior Publication Data

US 2021/0166555 A1 Jun. 3, 2021

(30) Foreign Application Priority Data

Nov. 29, 2019 (KR) .......................... 10-2019-0156731

(51) Int. Cl.
*G08C 23/02* (2006.01)
*G01S 5/18* (2006.01)
*H04B 11/00* (2006.01)

(52) U.S. Cl.
CPC ................ *G08C 23/02* (2013.01); *G01S 5/18* (2013.01); *H04B 11/00* (2013.01)

(58) Field of Classification Search
CPC ......... G08C 23/02; G01S 5/18; G01S 3/8083; H04B 11/00; H04R 2227/005; H04N 21/42203; H04N 21/439; G08B 3/1016
See application file for complete search history.

(56) References Cited

U.S. PATENT DOCUMENTS

| 8,620,213 | B2 | 12/2013 | Mallinson et al. |
| 2011/0159959 | A1 | 6/2011 | Mallinson et al. |
| 2012/0263020 | A1* | 10/2012 | Taylor .................. H04W 64/00 367/124 |
| 2015/0264529 | A1* | 9/2015 | Cho ...................... H04W 4/025 455/456.6 |

(Continued)

FOREIGN PATENT DOCUMENTS

| KR | 10-2015-0107416 | 9/2015 |
| KR | 10-2015-0124768 | 11/2015 |

(Continued)

OTHER PUBLICATIONS

International Search Report and Written Opinion dated Mar. 15, 2021 in corresponding International Application No. PCT/KR2020/016312.

(Continued)

*Primary Examiner* — Vernal U Brown
(74) *Attorney, Agent, or Firm* — Nixon & Vanderhye, P.C.

(57) ABSTRACT

Disclosed is an electronic apparatus configured to identify a location of an object. The electronic apparatus includes: a sound output unit comprising sound output circuitry; and a processor configured to: obtain first sound information from an external apparatus that receives a first sound output from the sound output unit, obtain second sound information from the external apparatus that receives a second sound output from an object, and identify locations of the electronic apparatus and the object with respect to the external apparatus based on a first signal characteristic and a second signal characteristic respectively detected using the obtained first sound information and second sound information.

20 Claims, 37 Drawing Sheets

(56) References Cited

U.S. PATENT DOCUMENTS

| | | | |
|---|---|---|---|
| 2017/0048648 A1 | 2/2017 | Lee et al. | |
| 2018/0232201 A1 | 8/2018 | Holtmann | |
| 2018/0252793 A1* | 9/2018 | Hazlewood | ............... G01S 5/18 |
| 2018/0359595 A1 | 12/2018 | Son et al. | |
| 2019/0253801 A1* | 8/2019 | Arteaga | ................. H04R 5/027 |

FOREIGN PATENT DOCUMENTS

| | | |
|---|---|---|
| KR | 10-2017-0066054 | 6/2017 |
| KR | 10-2019-0041730 | 4/2019 |
| KR | 10-1975423 | 5/2019 |
| WO | 2013/095920 | 6/2013 |

OTHER PUBLICATIONS

European Search Report and Written Opinion dated Apr. 23, 2021 in corresponding Application No. 20203472.4.

* cited by examiner

SECOND EXTERNAL APPARATUS

FIRST EXTERNAL APPARATUS

ELECTRONIC APPARATUS AND METHOD OF CONTROLLING THE SAME

CROSS-REFERENCE TO RELATED APPLICATION

This application is based on and claims priority under 35 U.S.C. § 119 to Korean Patent Application No. 10-2019-0156731, filed on Nov. 29, 2019, in the Korean Intellectual Property Office, the disclosure of which is incorporated by reference herein in its entirety.

BACKGROUND

Field

The disclosure relates to an electronic apparatus, which uses inaudible frequency communication to detect a location of an object, and a method of controlling the same.

Description of Related Art

Various electronic apparatuses such as a television (TV), a remote controller, a smartphone, an artificial intelligence (AI) speaker, various home appliances, etc. are placed at home or in office. The electronic apparatuses may provide convenient services based on a user's location, when a current location or movement of the user is known. A conventional electronic apparatus for tracing a user's location needs to include various sensors, cameras and the like modules for detecting the user's location, or previously set predetermined regions and external apparatuses' locations.

However, conventionally used or newly purchased electronic apparatuses may not include the modules for detecting a user. Further, the remote controller, the smartphone, the AI speaker and the like external apparatus are not stationarily located but often move location, and therefore their previous settings are meaningless. Accordingly, technology for detecting a user's location is required even through there are no modules for detecting a user or it is different to previously register the external apparatuses.

SUMMARY

Embodiments of the disclosure provide an electronic apparatus which can easily detect a location of an object through inaudible frequency communication, and a method of controlling the same.

According to an example embodiment, an electronic apparatus is provided, the electronic apparatus including: a sound output unit including sound output circuitry; and a processor configured to: obtain first sound information from an external apparatus that receives a first sound output from the sound output unit, obtain second sound information from the external apparatus that receives a second sound output from an object, and identify locations of the electronic apparatus and the object with respect to the external apparatus based on a first signal characteristic and a second signal characteristic respectively detected using the obtained first sound information and second sound information.

The external apparatus may include a plurality of external apparatuses.

One of the plurality of external apparatuses may be configured to obtain the second sound information of the object from the other external apparatuses.

The processor may be configured to detect a location pattern of the object or the external apparatus based on at least one of loudness, response time, a noise level or a noise frequency of the first sound or second sound.

The first sound information and the second sound information may include identification information of the external apparatuses.

The identification information of the external apparatus may include at least one among identification (ID) of the external apparatus, a name of the external apparatus, an inaudible frequency assigned to the external apparatus, or a noise frequency.

The second sound information may include an inaudible band signal output from the external apparatus by converting the second sound output from the object.

The processor may be configured to output the first sound based on an inaudible band of a sound output from the sound output.

The processor may be configured to generate a band having a frequency having a largest difference from an audible frequency within a usable inaudible band.

The processor may be configured to change the signal characteristic of the first sound based on the location of the object.

The processor may be configured to control an operation of the external apparatus based on the location of the object.

According to an example embodiment a method of controlling an electronic apparatus is provided, the method including: obtaining first sound information from an external apparatus that receives a first sound output from an object; outputting a second sound; obtaining second sound information from the external apparatus that receives the output second sound; and identifying locations of the electronic apparatus and the object with respect to the external apparatus based on a first signal characteristic and a second signal characteristic respectively detected using the obtained first sound information and second sound information.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
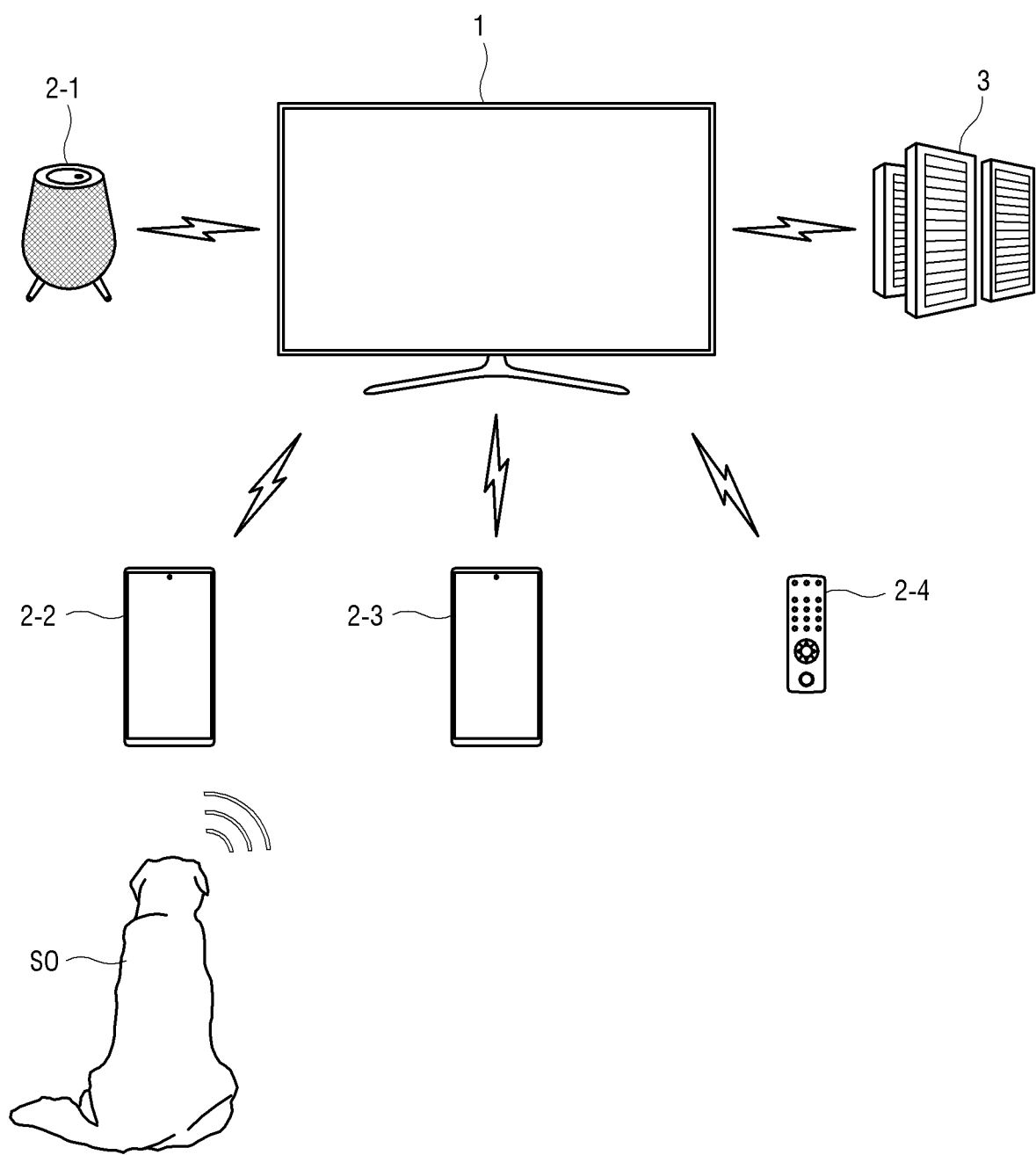
FIG. 1 is a diagram illustrating an example electronic apparatus having a function of identifying a location of an object according to various embodiments.

Below, various example embodiments of the disclosure will be described in greater detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following example embodiments. In the following descriptions, details about publicly known technologies or configurations may be omitted if they unnecessarily obscure the gist of the disclosure.

In the disclosure, terms "have," "may have," "include," "may include," etc. indicate the presence of corresponding features (e.g. a numeral value, a function, an operation, or an element such as a part, etc.), and do not exclude the presence of additional features.

In the disclosure, terms "A or B", "at least one of A or/and B", "one or more of A or/and B" or the like may include all possible combinations of elements enumerated together. For example, "A or B", "at least one of A and B", or "at least one of A or B" may refer to all of the cases of (1) including at least one A, (2) including at least one B, or (3) including all of at least one A and at least one B.

In the disclosure, terms "first", "second", etc. are used simply to distinguish one element from another, and singular forms are intended to include plural forms unless otherwise mentioned contextually.

In addition, in the disclosure, terms "upper", "lower", "left", "right", "inside", "outside", "inner", "outer", "front", "rear", etc. are defined with respect to the accompanying drawings, and do not restrict the shape or location of the elements.

Further, in the disclosure, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the sub processor configured to perform A, B, and C" may refer, for example, and without limitation, to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

In the disclosure, an electronic apparatus according to various embodiments may include an electronic device providing various kinds of content or service, for example, and without limitation, at least one of a television (TV), an artificial intelligence (AI) speaker, a smartphone, a tablet personal computer (PC), a mobile phone, an image phone, an electronic (E)-book reader, a desktop PC, a laptop PC, a netbook computer, a workstation, a server, a personal digital assistant (PDA), an MP3 player, an wearable device, or the like. In some embodiments, the electronic apparatus may for example, and without limitation, include at least one of a digital versatile disk (DVD) player, an audio system, a refrigerator, an air conditioner, an oven, a microwave oven, a washing machine, an air cleaner, a set-top box, a home-automation control panel, a security control panel, a media box, a game console, an electronic dictionary, a camcorder, an electronic frame, or the like.

In an embodiment, the electronic apparatus may, for example, and without limitation, include at least one of various medical apparatuses (e.g. various portable medical measurement apparatuses (glucose monitors, heart-rate monitors, blood-pressure gauge monitors, thermometers, etc.), magnetic resonance angiography (MRA), magnetic resonance imaging (MRI), computed tomography (CT), scanning machines, ultrasonography machines, etc.), a navigation system, a global navigation satellite system (GNSS), an event data recorder (EDR), a flight data recorder (FDR), a vehicle infotainment system, marine electronic equipment (e.g. a marine navigation system, a gyrocompass, etc.), avionics, security devices, vehicle head units, industrial or household robots, a drone, an automated teller machine (ATM) of a financial institution, a point-of-sales (POS) device of a store, Internet of Things (IOT) (e.g. a lamp, various sensors, a sprinkler, a fire alarm, a temperature controller, a street light, a toaster, an exerciser, a hot-water tank, a heater, a boiler, etc.), or the like.

External apparatuses may include, for example, and without limitation, sound input/output units (e.g., including sound input/output circuitry), for example, a microphone, a loudspeaker, a soundbar, an electronic device with an interface portion, such as, for example, and without limitation, a remote controller, a TV, a smartphone, an AI speaker, an air conditioner, an audio system, etc.

An object may include, for example, and without limitation, a human, an animal and a machine which can make a sound (a voice, a cry, a song, a sound, noise, etc.).

For convenience of description, the inaudible frequency signal output from the electronic apparatus may be referred to, for example, as a first sound S1 and the sound of the object may be referred to, for example, as a second sound S2. The order of the first sound S1 and the second sound S2 does not matter.

In the disclosure, a term "user" may refer to a human who uses the electronic apparatus 1 or an apparatus (e.g. an AI electronic apparatus) that uses the electronic apparatus 1.

FIG. 1 is a diagram illustrating an example electronic apparatus 1, which supports a function of identifying a location of an object SO, according to various embodiments.

As shown in FIG. 1, the electronic apparatus 1 may, for example, and without limitation, be a TV that displays an image. Of course, the electronic apparatus 1 is not limited to the TV.

The electronic apparatus 1 may output the first sound S1 as an inaudible frequency signal.

The external apparatuses 2-1, 2-2, 2-3, 2-4 (which may be referred to herein as external apparatuses 2-1-2-4 for convenience) may receive the second sound of the object SO, for example, the second sound made by a companion animal, e.g., a dog, and transmit the second sound to the electronic apparatus 1 through an interface, or may output the second sound as converted into an inaudible frequency signal. Further, the external apparatuses 2-1~2-4 may receive the first sound output from the electronic apparatus 1 and feed the first sound back to the electronic apparatus 1 or may output the first sound as converted into an inaudible frequency signal.

The electronic apparatus 1 may obtain first sound information and second sound information transmitted or output from the external apparatuses 2-1~2-4.

The electronic apparatus 1 may detect a first signal characteristic based on the first sound information obtained from the external apparatuses 2-1~2-4 and obtain a first location pattern of the electronic apparatus 1 with respect to the external apparatuses 2-1~2-4.

The electronic apparatus 1 may detect a second signal characteristic based on the second sound information obtained from the external apparatuses 2-1~2-4 and obtain a second location pattern of the object SO with respect to the external apparatuses 2-1~2-4.

The electronic apparatus 1 may obtain the locations of the object SO with respect to the external apparatuses 2-1~2-4, and the electronic apparatus 1 based on the first location pattern and the second location pattern.

The external apparatuses 2-1~2-4 may for example, and without limitation, include an AI speaker 2-1, a first smartphone 2-2, a second smartphone 2-3, and a remote controller 2-4 which are connectable to the electronic apparatus 1 through a network, but are not limited thereto. The external apparatus may include a single external apparatus or a plurality of external apparatuses.

The AI speaker 2-1 may be installed with applications for controlling peripheral apparatuses such as TV, IoT apparatuses, etc. The AI speaker 2-1 may be installed with voice recognition assistance to receive and recognize a user's voice command and perform operations. The AI speaker 2-1 may transmit an image processed based on a user's command to the electronic apparatus 1 so that the electronic apparatus 1 can display the image. Of course, the AI speaker 2-1 may include a display in itself to display video content.

The first and second smartphones 2-2 and 2-3 may be installed with a remote control application to control the electronic apparatus 1. Further, the first and second smartphones 2-2 and 2-3 may include a microphone for receiving a user's voice. The first and second smartphones 2-2 and 2-3 may receive and digitalize a user's analog voice signal through the built-in microphone and transmit the digitalized voice signal to the electronic apparatus 1. The first and second smartphones 2-2 and 2-3 may support a voice recognition function of autonomously recognizing the received voice.

The remote controller 2-4 may include a microphone for receiving a user's voice command. The remote controller 2-4 digitalizes an analog voice signal and transmit it to the electronic apparatus 1 through, for example, Bluetooth or the like.

A server 3 may receive a voice signal, or a character string converted from and/or an acoustic characteristic detected using the voice signal from the electronic apparatus 1.

The server 3 may include, for example, and without limitation, an IoT server that controls the electronic apparatus 1, the external apparatuses 2-1~2-4, etc. connected through a wireless network.

The server 3 may, for example, be embodied by a voice recognition server that recognizes a voice input through the electronic apparatus 1, a content server that provides content, etc. The server 3 may, for example, be embodied by an integrated server that provides various services, or a plurality of servers that individually provide services.

Figure 2:
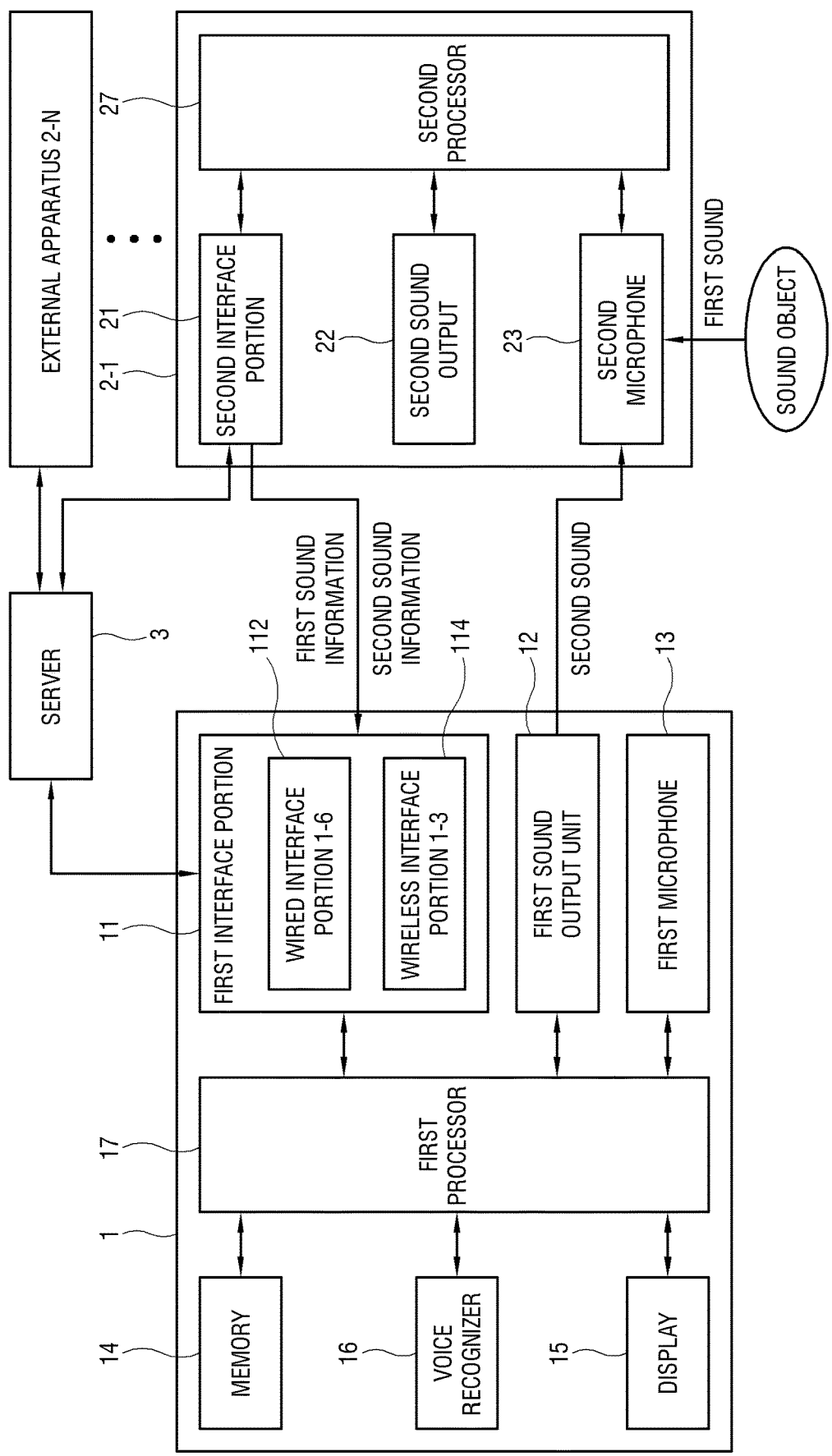
FIG. 2 is a block diagram illustrating an example configuration of the electronic apparatus in FIG. 1 according to various embodiments.
Figure 3:
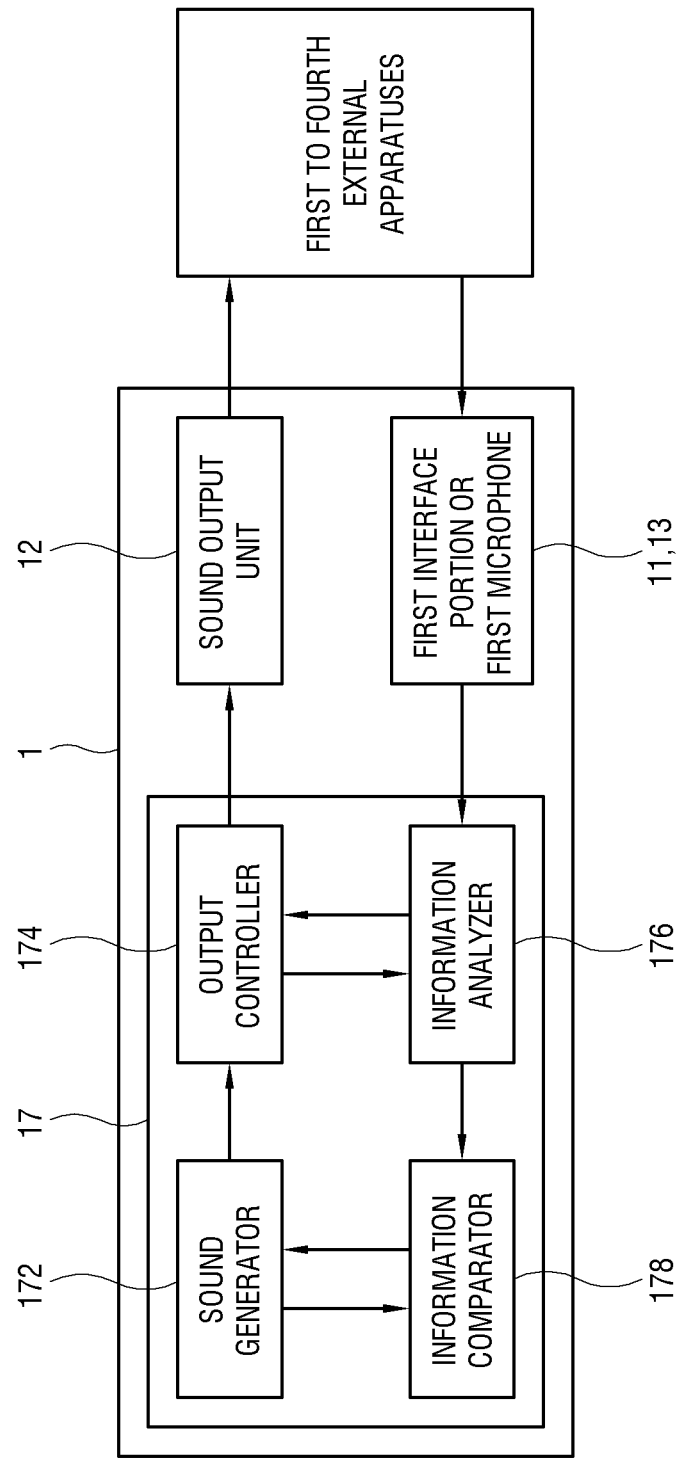
FIG. 3 is a block diagram illustrating an example first processor of FIG. 2 according to various embodiments.

FIG. 2 is a block diagram illustrating an example electronic apparatus in FIG. 1 according to various embodiments, and FIG. 3 is a block diagram illustrating an example first processor 17 of FIG. 2 according to various embodiments.

The electronic apparatus 1 may include a first interface portion 11 that can receive various pieces of data from the external apparatus, for example, first sound information output from a first sound output unit 12 and second sound information generated by the object SO.

The first interface portion 11 may include first to sixth wired interface portions (e.g., including various wired interface circuitry) 112 and first to third wireless interface portions (e.g., including various wireless interface circuitry) 114.

The first wired interface portion may include various interfaces including various wired interface circuitry for connection with a terrestrial/satellite broadcasting antenna, connection with a cable for cable-broadcasting to receive a broadcast signal, etc.

The second wired interface portion may include various wired interface circuitry including, for example, and without limitation, high definition multimedia interface (HDMI), DisplayPort (DP), a digital visual interface (DVI), Component, S-Video, Composites (RCA terminals), etc. For connection with imaging devices.

The third wired interface portion may include various wired interface circuitry, such as, for example, and without limitation, a universal serial bus (USB) interface, etc. For connection with universal connection with electronic devices 3.

The fourth wired interface portion may include various wired interface circuitry, such as, for example, and without limitation, an interface for connection with an optical cable device.

The fifth wired interface portion may include various wired interface circuitry, such as, for example, and without limitation, an interface for connection with audio devices such as a headset, an earphone, a loudspeaker, etc.

The sixth wired interface portion may include various wired interface circuitry, such as, for example, and without limitation, an Ethernet interface for connection with wired network devices, etc.

The first wireless interface portion may include various wireless interface circuitry, such as, for example, and without limitation, an interface for connection with a wireless network device, such as, for example, and without limitation, Wi-Fi, Bluetooth, ZigBee, Z-wave, radio frequency identification (RFID), WiGig, Wireless HD, Ultra-Wide Band (UWB), Wireless USB, near field communication (NFC), etc.

The second wireless interface portion may include various wireless interface circuitry, such as, for example, and without limitation, an infrared (IR) transceiving module for transmitting and/or receiving a remote-control signal.

The third wireless interface portion may include various wireless interface circuitry, such as, for example, and without limitation, an interface for connection with mobile communication devices, such as, for example, and without limitation, second generation (2G)~fifth generation (5G), etc.

The first interface portion 11 may include dedicated communication modules including various circuitry dedicated for communication with a mobile apparatus and a server, respectively.

The first interface portion 11 may include a common communication module or the like for communication with all the external apparatuses 2-1~2-N. For example, all of a first smartphone (see '2-2' in FIG. 1), a second smartphone (see '2-3' in FIG. 1), and a remote controller (see '2-4' in FIG. 1) may use Wi-Fi modules in common to perform communication.

The first interface portion 11 may include an input interface portion and an output interface portion, each including various interface circuitry. In this case, the input interface portion and the output interface portion may be integrated into a single module or embodied by separate modules.

The electronic apparatus 1 may include the first sound output unit (e.g., including various sound output circuitry) 12 that can output a sound.

The first sound output unit 12 as a sound output may include, for example, and without limitation, a loudspeaker, a soundbar, or the like that can output a sound as an audible frequency signal and an inaudible frequency signal.

The electronic apparatus 1 may include a first microphone 13 that can receive a sound from the outside. The first microphone 13 may obtain the second sound of the object SO directly from the object SO or indirectly through the external apparatuses 2-1~2-4.

The electronic apparatus 1 may include, for example, a computer-readable recording medium, which may include a memory 14 configured to store unrestricted data. The memory 14 may be accessed by the processor 17 to read, write, modify, update, etc. data. The data stored in the memory 14 may for example include raw data such as the first sound information, the second sound information, or etc. received from the external apparatuses 2-1~2-4, first and second signal characteristic data respectively detected using the first sound information and the second sound information, first location pattern information about external apparatuses 2-1~2-4 and second location pattern information of the electronic apparatus 1 with respect to the external apparatuses 2-1~2-4 which are obtained from the first and second signal characteristic data, history information, etc.

The memory 14 may include a voice recognition module (or a voice recognition engine) including, for example, various program elements for recognizing a received voice. Of course, the memory 14 may include an operating system, various applications executable on the operating system, image data, appended data, etc.

The memory 14 may include, for example, a nonvolatile memory in which the control program to be executed by the first processor 17 is installed, and/or a volatile memory to which at least a part of the installed control program is loaded.

The memory 14 may include a storage medium of at least one type among, for example, and without limitation, a flash memory type, a hard disk type, a multimedia card micro type, a card type (e.g. SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, or an optical disc.

The electronic apparatus 1 may include a display 15 that displays image content or a user interface (UI).

The display 15 may display image content stored in the memory 14 or received from the content providing apparatus or the server through the first interface portion 11.

There are no limits to the type of the display 15. For example, the first display 130 may be embodied in various display panels including, for example, and without limitation, liquid crystal, plasma, light-emitting diodes, organic light-emitting diodes, a surface-conduction electron-emitter, a carbon nano-tube, nano-crystal, etc.

The electronic apparatus 1 may include a voice recognizer (e.g., including various voice recognition circuitry and/or executable program elements) 16 that can recognize a user's voice.

The voice recognizer 16 may execute the voice recognition module (or the voice recognition engine) stored in the memory 14, and recognize a user's voice. The voice recognizer 16 recognizes whether a user's voice is a control command for controlling the electronic apparatus 1. The control command may for example include commands for turning on or off the electronic apparatus 1, channel switching, volume control, etc. Further, the control command may for example include a command for requesting display of a UI provided by the content providing apparatus connected to the electronic apparatus 1.

An analog voice signal received in the first microphone internally provided in the electronic apparatus 1 may be converted into a digital signal, and transmitted to the first processor 17. The received voice signal may be converted into a text through the voice recognizer 16 internally provided in the electronic apparatus 1.

The voice recognizer 16 may be integrally provided in the first processor 17 or be excluded from the electronic apparatus 1. In this case, the received voice signal may be transmitted to the server (or the voice recognition server) 5.

The server (or the voice recognition server) 5 may be a speech-to-text (STT) server having a function of converting data related to a voice signal into a proper text or a main server also serving as the STT server.

The STT server may return the processed data to the electronic apparatus 1, or may directly transmit the processed data to another server.

As described above, the first processor 17 of the electronic apparatus 1 may include various processing circuitry and perform a function based on a text received in the electronic apparatus 1 or a text autonomously converted by the voice recognizer 16 of the electronic apparatus 1. In this case, a converted text may also be transmitted to and processed in a separate server (or a server different from the STT server or a server serving as the STT server), and then information/data of the processed text may be returned to the electronic apparatus 1, so that the specific function can be implemented based on the information/data.

The electronic apparatus 1 may include the first processor 17 including various processing circuitry that generally controls elements.

The first processor 17 may extract first and second signal characteristics from the first sound information and the second sound information which are obtained from the external apparatuses 2-1~2-4. The first and second signal characteristics may include, for example, and without limitation, loudness, response time, a noise level, a noise frequency, etc. of the first and second sounds.

Referring to FIG. 3, the processor (e.g., including processing circuitry) 17 may include a sound generator (e.g., including sound generating circuitry and/or executable program elements) 172, an output controller (e.g., including circuitry) 174, an information analyzer (e.g., including various processing circuitry and/or executable program elements) 176, and an information comparator (e.g., including various processing circuitry and/or executable program elements)178.

The sound generator 172 may include various processing circuitry and/or executable program elements and dynamically generate a second sound S2 having an inaudible frequency in a specific region.

The output controller 174 may include various circuitry and control output timing of the second sound S2 having the inaudible frequency generated by the sound generator 172. The second sound S2 having the inaudible frequency generated by the sound generator 172 may be output to the outside through the sound output unit 12 under control of the output controller 174. The second sound S2 having the inaudible frequency output through the sound output unit may be obtained in the first to fourth external apparatuses and directly or indirectly fed back through the first interface portion 11 or a first microphone 13.

The information analyzer 176 may include various processing circuitry and/or executable program elements and respectively detect the first signal characteristic and the second signal characteristic based on the first sound information and the second sound information received from the first to fourth external apparatuses through the first interface portion 11 or the first microphone 13.

The information comparator 178 may include various processing circuitry and/or executable program elements and compare relative locations of objects based on comparison between the first signal characteristic and the second signal characteristic received from the first to fourth external apparatuses.

For example, the first processor 17 may use, for example, and without limitation, at least one of machine learning, neural network, deep learning algorithms, or the like, as a rule-based or AI algorithm to perform at least a part among data analysis, data process and result information generation, in terms of performing at least one operation to identify the location of the object.

For example, the first processor 17 may function as a learner and a recognizer. The learner may for example include various processing circuitry and/or executable program elements and perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the memory 14 or the outside. The learning data may be data used for teaching the neural network, and may for example be used to teach a model for identifying the relative location of the object.

Before teaching the neural network based on the learning data, the learner may perform a preprocessing operation with regard to the obtained learning data or select data to be used in learning among a plurality of pieces of learning data. For example, the learner may process the learning data to have a preset format, apply filtering to the learning data, or process the learning data to be suitable for the learning by adding/removing noise to/from the learning data. The learner may use the preprocessed learning data for generating the neural network set to perform the operation of predicting the location where the wireless device 2 is highly likely to be present or absent.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are, for example, and without limitation, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, or the like.

The recognizer may include various processing circuitry and/or executable program elements and obtain target data to perform the operation of identifying the relative location of the object. The target data may be obtained from the memory 14 or the outside. The target data may be data targeted for recognition of the neural network. Before applying the target data to the learned neural network, the recognizer may preprocess the obtained target data or select data to be used in the recognition among a plurality of pieces of target data. For example, the recognizer may process the target data to have a preset format, apply filtering to the target data, or add/remove noise to/from the target data, thereby processing the target data into data suitable for recognition. The recognizer applies the preprocessed target data to the neural network, thereby obtaining an output value output from the neural network. According to various embodiments, the recognizer may obtain a probability value or a reliability value together with the output value.

The first processor 17 may include, for example, and without limitation, at least one common processor, for example, a central processing unit (CPU), an application processor (AP), a microprocessor, or the like, which loads at least a part of a control program from a nonvolatile memory installed with the control program to a volatile memory, and executes the loaded control program.

The first processor 17 may include, for example, and without limitation, a single-core processor, a dual-core processor, a triple-core processor, a quad-core processor, and the like multiple-core processor. The first processor may include a plurality of processors. The first processor 17 may for example include a main processor and a sub processor that operates in a sleep mode (e.g. when only standby power is supplied). Further, the processor, the ROM and the RAM are connected to one another via an internal bus.

The first processor 17 may be included in a main SoC mounted to a built-in PCB of the electronic apparatus 1. The main SoC may further include an image processor.

The control program may include a program(s) achieved in the form of at least one among a basic input/output system (BIOS), a device driver, an operating system, a firmware, a platform, and an application. The application may be previously installed or stored when the electronic apparatus 1 is manufactured, or may be installed for use in the future on the basis of data received corresponding to the application from the outside. The data of the application may for example be downloaded from an external server such as an application market to the electronic apparatus 1. Such an external server is an example of a computer program product, but not limited thereto.

Referring back to FIG. 2, the second external apparatus 2-1 may include a second interface portion (e.g., including interface circuitry) 21. The second interface portion 21 may include various interface circuitry and transmit the second sound information obtained from the object, together with identification information, to the electronic apparatus 1. The second interface portion 21 may receive the second sound information of the object together with the identification information from other external apparatuses 2-2~2-4, and transmit them to the electronic apparatus 1. The second interface portion 21 is similar to the foregoing first interface portion 11, and therefore repetitive descriptions thereof may not be repeated here.

The second external apparatus 2-1 may include a second sound output unit (e.g., including sound output circuitry) 22 that can output a sound.

The second sound output unit 22 may include, for example, and without limitation, a loudspeaker, a soundbar, or the like that can output a sound as an audible frequency signal and an inaudible frequency signal.

The second external apparatus 2-1 may include a second microphone 23 that can obtain a sound.

The second microphone 23 may obtain the first sound directly from the first sound output unit 12 of the electronic apparatus 1 or indirectly through other external apparatuses 2-2~2-4.

The second microphone 23 may obtain the second sound of the object SO directly from the object SO or indirectly through other external apparatuses 2-2~2-4.

The second external apparatus 2-1 may include a second processor (e.g., including processing circuitry) 27 that generally controls elements.

When the second processor 27 may include various processing circuitry and obtains the first sound information of the first sound output unit 22 through the second microphone 23 or receives the first sound information of the first sound output unit 22 from other external apparatuses 2-2~2-4 through the second interface portion 21, the second processor 27 may output the first sound information converted into the inaudible frequency signal together with the identification information of the second external apparatus-1 through the second sound output unit 22 or transmit the first sound information to the electronic apparatus 1 together with the identification information of the second external apparatus 2-1 through the first interface portion 21.

When the second processor 27 obtains the second sound information of the object through the second microphone 23 or receives the second sound information of the object from other external apparatuses 2-2~2-4 through the second interface portion 21, the second processor 27 may output the second sound information converted into the inaudible frequency signal together with the identification information of the second external apparatus 2-1 through the second sound output unit 22, or transmit the second sound information together with the identification information of the second external apparatus-1 to the electronic apparatus 1 through the first interface portion 21.

Figure 4:
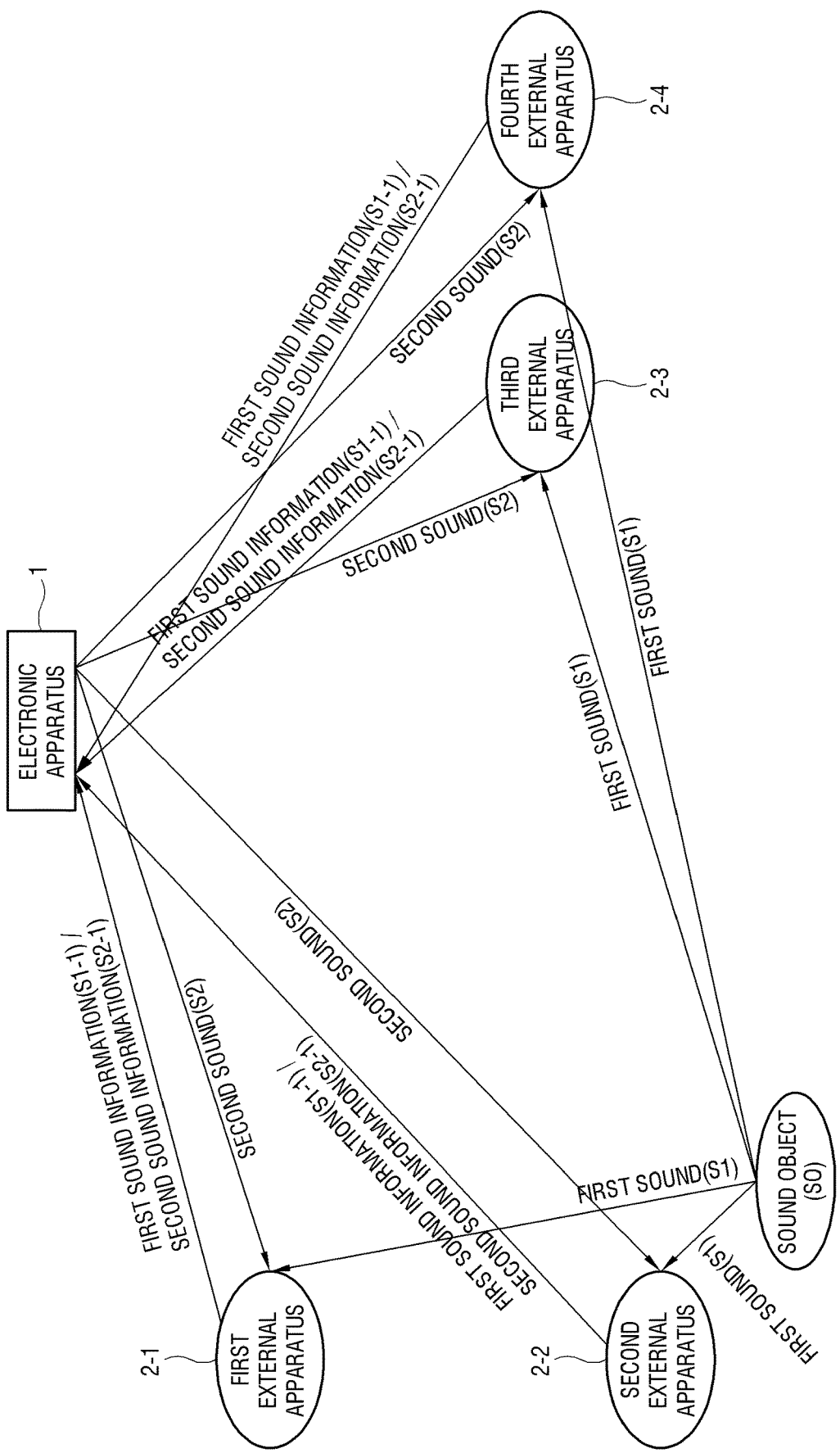
FIG. 4 is a diagram illustrating example placement of the electronic apparatus, external apparatuses and an object according to various embodiments.

FIG. 4 is a diagram illustrating example placement of the electronic apparatus 1, the first to fourth external apparatuses and the object SO according to various embodiments.

Referring to FIG. 4, the electronic apparatus 1 and, for example, four first to fourth external apparatuses 2-1~2-4 are present in a predetermined space. The object SO makes or outputs the first sound S1. The object SO may include, for example, and without limitation, a human, an animal, a machine, etc. The first sound S1 may include a voice uttered by the human; a cry of the animal; a voice, sound, noise or the like output from the machine; etc.

The electronic apparatus 1 may, as shown in FIG. 2, include the first interface portion 11, the first sound output unit 12, and the first processor 17.

The first to fourth external apparatuses 2-1~2-4 may, as shown in FIG. 2, include the second interface portion 21, the second sound output unit 22, and the second microphone 23.

When the object SO makes or outputs the first sound S1, each of the first to fourth external apparatuses 2-1~2-4 may obtain the first sound S1 through the second microphone 23.

The first to fourth external apparatuses 2-1~2-4 may transmit the first sound information S1-1, S1-2, S1-3 and S1-4 to the electronic apparatus 1. The first sound information may include the first sound S1 and the identification information of the first to fourth external apparatuses 2-1~2-4. The identification information may include one of the IDs or names of the first to fourth external apparatuses 2-1~2-4, to be transmitted to the electronic apparatus 1 by a hash value.

The electronic apparatus 1 may output the second sound S2 having the inaudible frequency signal. Thus, the output second sound S2 may be input to the first to fourth external apparatuses 2-1~2-4.

The first to fourth external apparatuses 2-1~2-4 may transmit the second sound information S2-1, S2-2, S2-3 and S2-4 including the input second sound S2 and the identification information as feedback to the electronic apparatus 1.

The electronic apparatus 1 may extract the first and second signal characteristics based on four pieces of first sound information S1-1, S1-2, S1-3 and S1-4 and four pieces of second sound information S2-1, S2-2, S2-3 and S2-4 received from the four first to fourth external apparatuses 2-1~2-4, and identify the relative location of the object SO based on the extracted first and second signal characteristics.

Below, a method of identifying the relative location of the object SO according to various embodiments of the disclosure will be described in greater detail.

Figure 5:
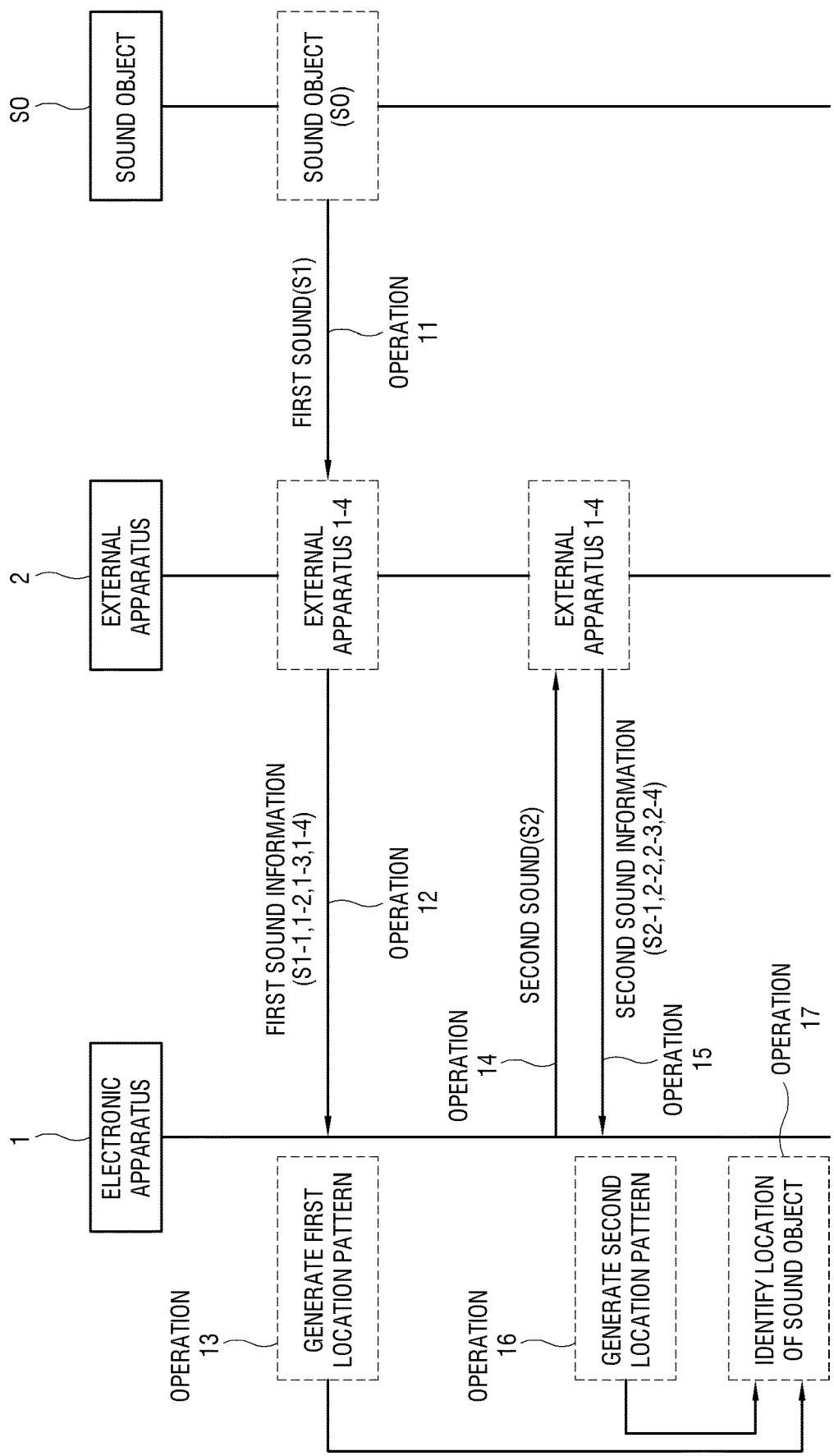
FIG. 5 is a signal flow diagram illustrating an example method of controlling the electronic apparatus according to various embodiments.

FIG. 5 is a signal flow diagram illustrating an example method of controlling the electronic apparatus 1 according to various embodiments.

At operation 11, the object SO makes or outputs the first sound S1. Such a made or output first sound S1 may be input to the microphones of the surrounding first to fourth external apparatuses.

At operation 12, when the first sound S1 is input to the first to fourth external apparatuses, the first to fourth external apparatuses may perform an event of generating the first sound information S1-1, S1-2, S1-3 and S1-4 based on the first sound S1, and transmitting the first sound information S1-1, S1-2, S1-3 and S1-4 to the electronic apparatus 1 through the interface portion, for example, Wi-Fi. The first sound information may include, for example, the first sound S1 and the identification information of the first to fourth external apparatuses. The identification information may include one of the IDs or names of the first to fourth external apparatuses, to be transmitted to the electronic apparatus 1 by a hash value. For example, the first to fourth external apparatuses may transmit their own identification information OD1, OD2, OD3 and OD4 together with the input first sound S1 to the electronic apparatus 1.

According to an embodiment, the first to fourth external apparatuses may convert the first sound S1 into the inaudible frequency signals, which do not overlap with one another, and output them again through the sound output units. In this case, the first to fourth external apparatuses may output the inaudible frequencies in proportion to the loudness of the input first sound S1. The electronic apparatus 1 may obtain the inaudible frequency signals, which are output from the first to fourth external apparatuses without overlapping with one another, through the microphone.

At operation 13, the electronic apparatus 1 extracts the first signal characteristics from the four first sound information S1-1, S1-2, S1-3 and S1-4 received from the four first to fourth external apparatuses, and generate the first location pattern based on the extracted first signal characteristics.

The first signal characteristics may include, for example, and without limitation, at least one of the loudness, the response time, the noise level, or the noise frequency of the first sound S1. Of course, the first signal characteristics are not limited to only the loudness, the response time, the noise level, or the noise frequency of the first sound S1, but may include any parameter as long as it is varied depending on distances, spaces, surrounding objects, etc.

The loudness of the first sound S1 may refer, for example, to a volume level within a predetermined range, and may include a parameter that varies depending on distances, spaces, surrounding objects, etc.

The response time of the first sound S1 may refer, for example, to a point in time when the first sound S1 is input, and may include a parameter that varies depending on distances, spaces, surrounding objects, etc.

The noise level of the first sound S1 may refer, for example, to a level of noise included in the first sound S1, and may include a parameter that varies depending on distances, spaces, surrounding objects, etc.

The noise frequency of the first sound S1 may refer, for example, to a noise frequency characteristic included in the first sound S1, and may include a parameter that varies depending on distances, spaces, surrounding objects, etc.

Figure 6:
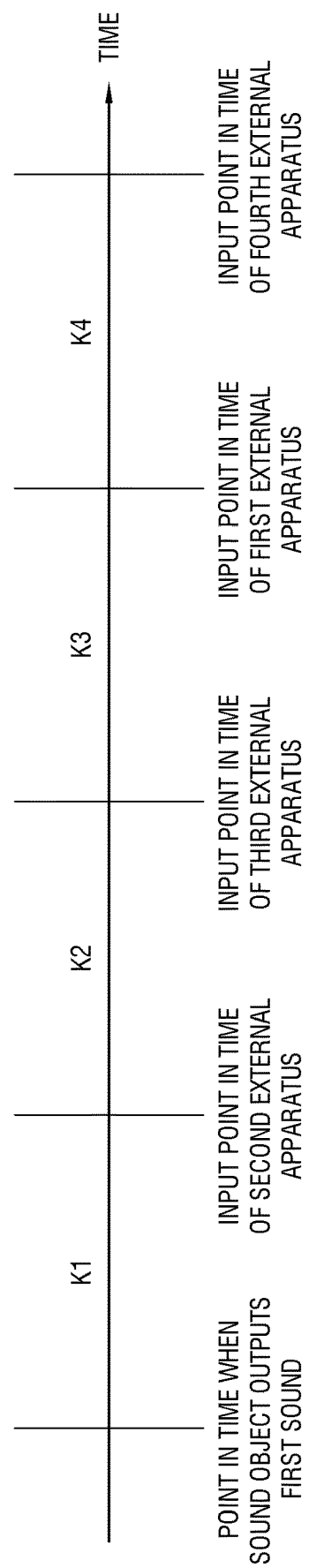
FIG. 6 is a diagram illustrating an example pattern of points in time when a first sound of an object is input to external apparatuses according to various embodiments.
Figure 9:
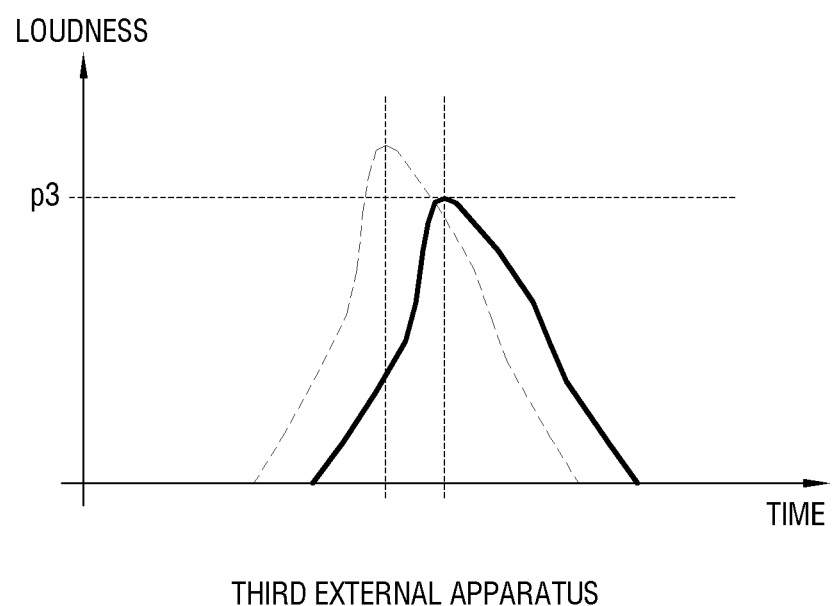
FIG. 9 is a graph illustrating an example first signal characteristic waveform of a first sound S1-3 input to a third external apparatus according to various embodiments.
Figure 10:
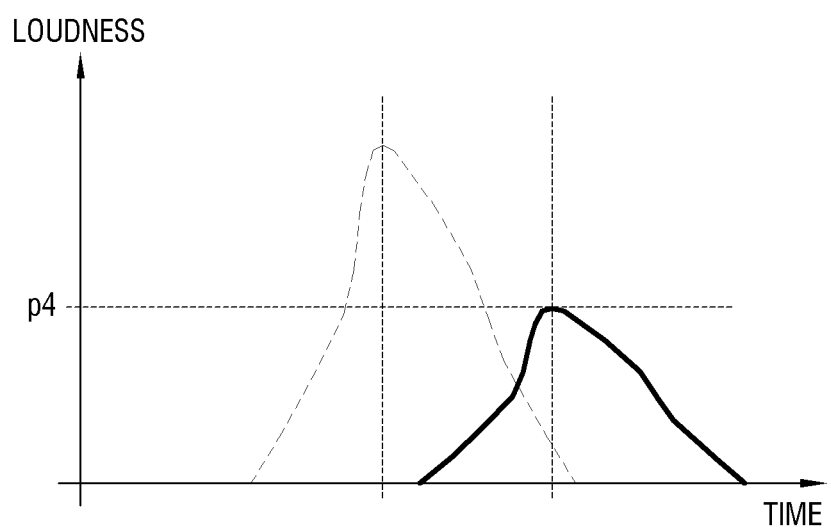
FIG. 10 is a graph illustrating an example first signal characteristic waveform of a first sound S1-4 input to a fourth external apparatus according to various embodiments.
Figure 11:
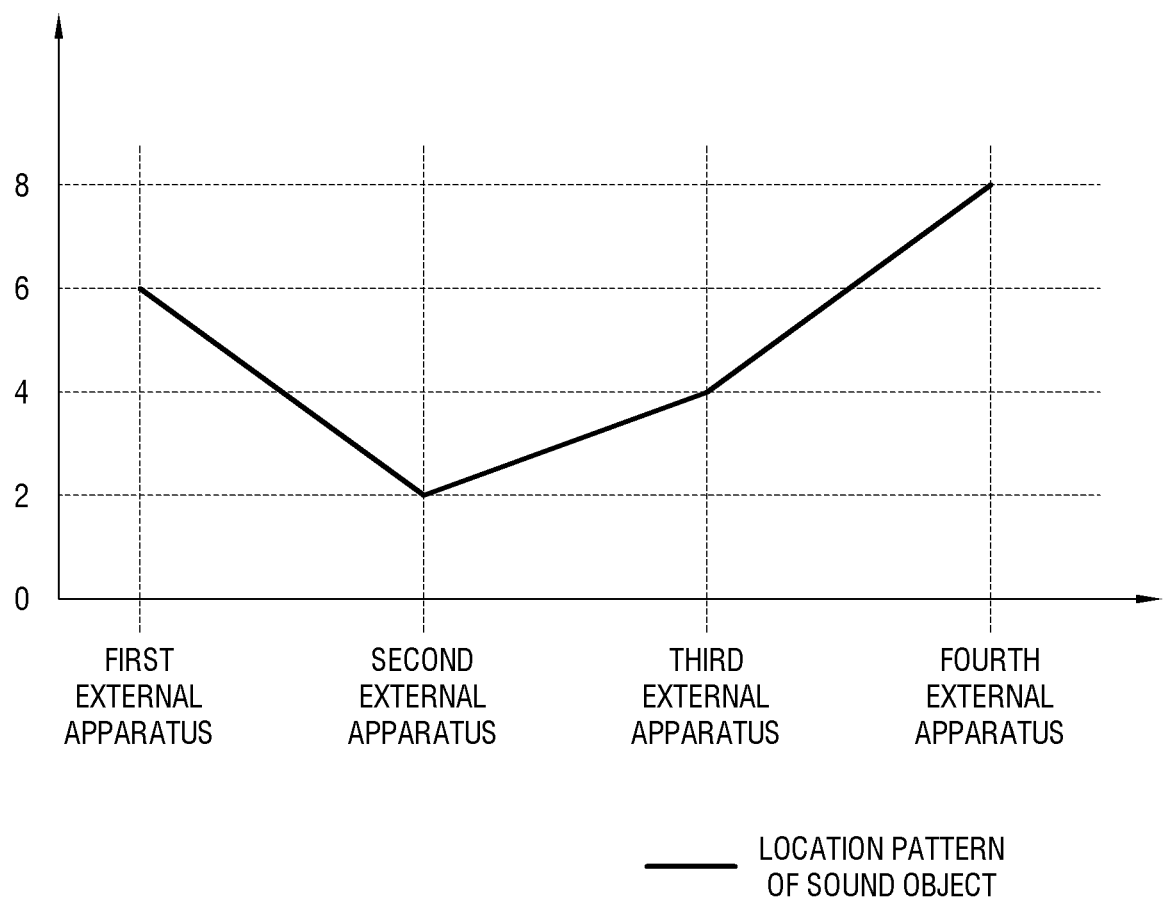
FIG. 11 is a graph illustrating an example first location pattern generated based on first signal characteristics of the first sounds S1-1, S1-2, S1-3 and S1-4 according to various embodiments.

FIG. 6 is a diagram illustrating an example pattern of points in time when the first sound S1 of the object SO is input to first to fourth external apparatuses, FIGS. 7, 8, 9 and 10 are graphs illustrating example first signal characteristic waveforms of the first sounds S1-1, S1-2, S1-3 and S1-4 input to the first to fourth external apparatuses, and FIG. 11 is a graph illustrating an example first location pattern generated based on first signal characteristics of the first sounds S1-1, S1-2, S1-3 and S1-4 according to various embodiments.

Referring to FIG. 6, points in time when the first sound S1 is input to the first to fourth external apparatuses may be sequenced in order of distances from the object SO, e.g., in order of the second external apparatus, the third external apparatus, the first external apparatus and the fourth external apparatus.

Figure 7:
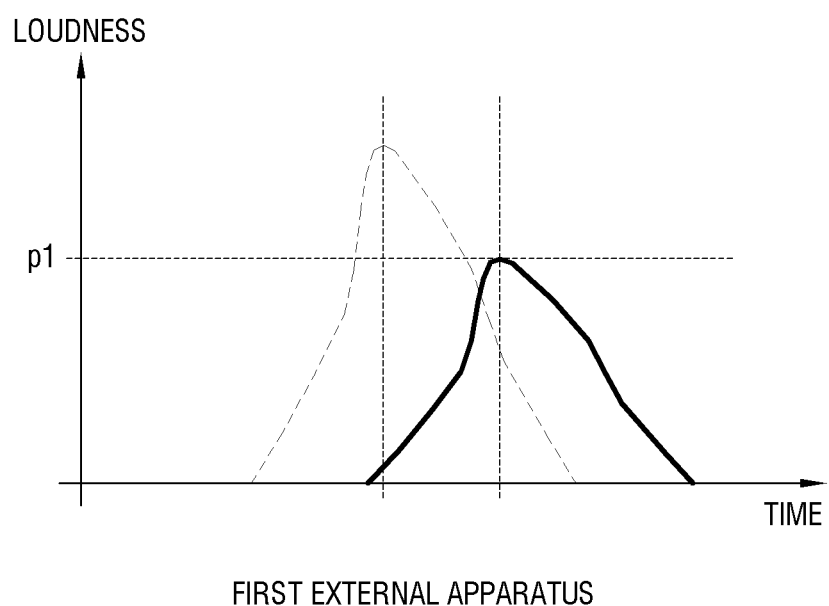
FIG. 7 is a graph illustrating an example first signal characteristic waveform of a first sound S1-1 input to a first external apparatus according to various embodiments.

Referring to FIG. 7, the first external apparatus may receive the first sound S1 having the loudness p1 output from the object SO.

Figure 8:
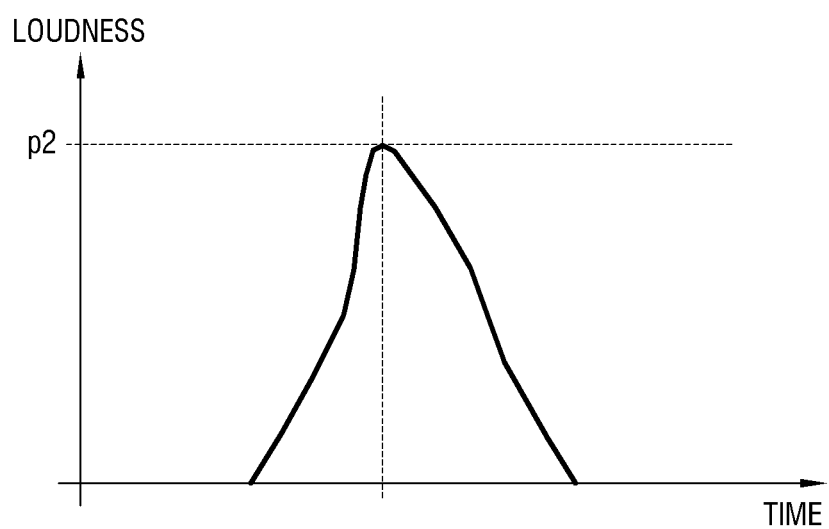
FIG. 8 is a graph illustrating an example first signal characteristic waveform of a first sound S1-2 input to a second external apparatus according to various embodiments.

Referring to FIG. 8, the second external apparatus may receive the first sound S1 having the loudness p2 output from the object SO.

Referring to FIG. 9, the third external apparatus may receive the first sound S1 having the loudness p3 output from the object SO.

Referring to FIG. 10, the fourth external apparatus may receive the first sound S1 having the loudness p4 output from the object SO.

Referring to FIG. 11, the first location pattern based on the loudness of the first sound S1 shows that the object SO is located closest to the second external apparatus and farthest away from the fourth external apparatus. Through the first location pattern, it is possible to identify relative locations between the object SO and the first to fourth external apparatuses.

Referring back to FIG. 5, at operation 14, the electronic apparatus 1 generates the first location pattern of the object SO based on the first sound information S1-1, S1-2, S1-3 and S14, and thus output the second sound S2 having the inaudible frequency through the sound output unit.

Figure 12:
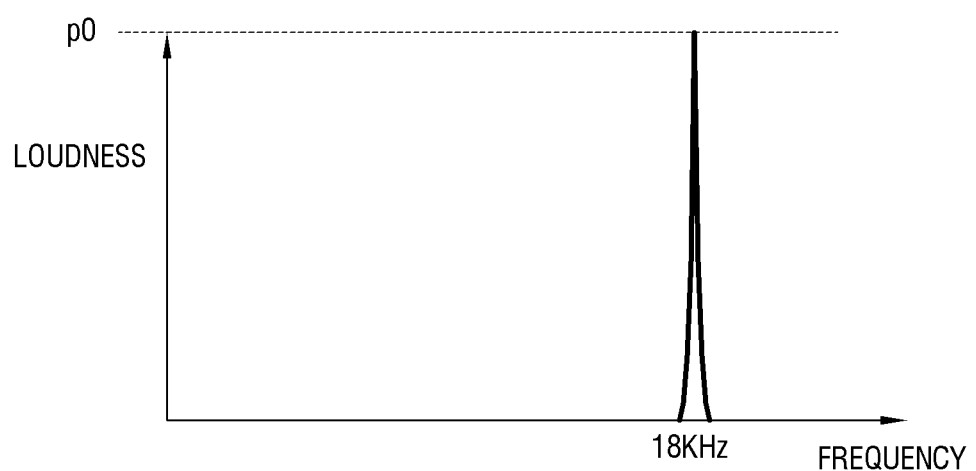
FIG. 12 is a graph illustrating an example second sound of an inaudible frequency signal output from an electronic apparatus according to various embodiments.

FIG. 12 is a graph illustrating an example second sound having an inaudible frequency signal output from the electronic apparatus 1 according to various embodiments.

As shown therein, the second sound S2 having the inaudible frequency may be output at a frequency of 18 kHz with the loudness p0 of the first sound S1. The output second sound S2 having the inaudible frequency may be input to the surrounding first to fourth external apparatuses.

Inaudible frequency communication may be performed in such a manner that the electronic apparatus 1 uses a low or high frequency band except a predetermined audible frequency band to generate and output the inaudible frequency signal and the first to fourth external apparatuses receive the inaudible frequency signal.

FIGS. 13, 14, 15 and 16 are graphs illustrating example first to fourth inaudible frequency signals used in the inaudible frequency communication according to various embodiments.

Figure 13:
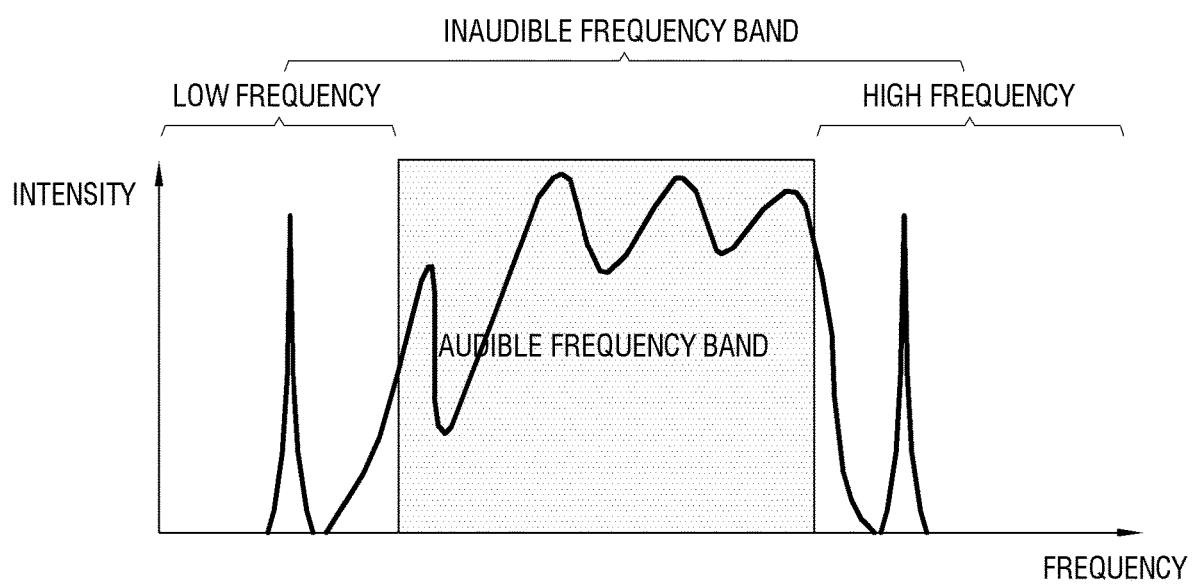
FIG. 13 is a graph illustrating an example first inaudible frequency signal used in inaudible frequency communication according to various embodiments.

Referring to FIG. 13, the first inaudible frequency signal may be obtained by removing signals of low and high frequency bands, which are beyond the audible frequency band, and then generating one signal pulse in each of the corresponding low and high frequency bands.

Figure 14:
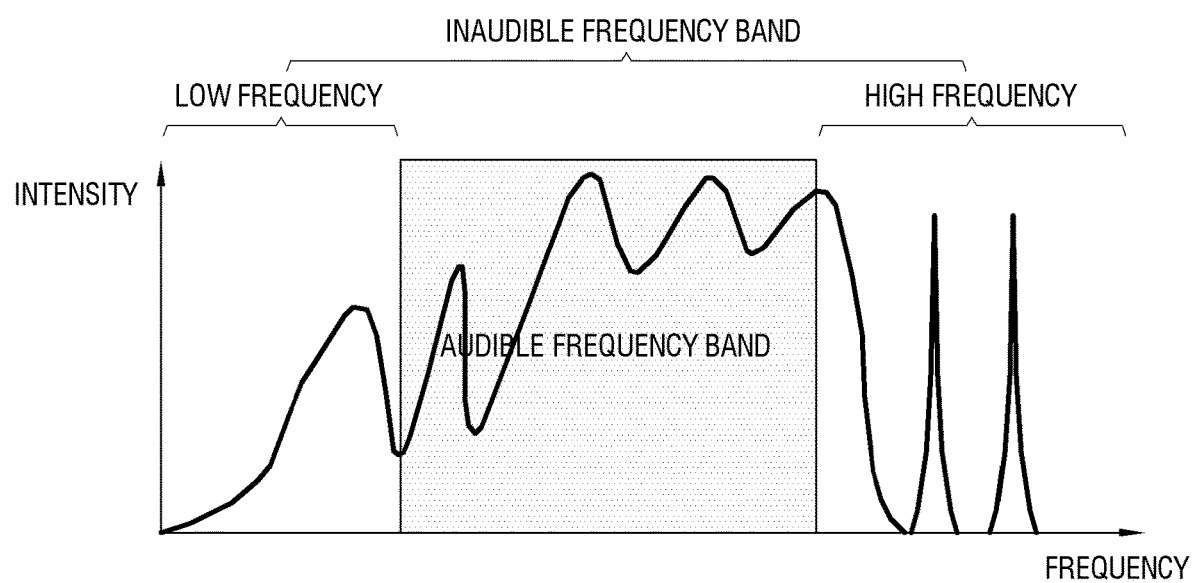
FIG. 14 is a graph illustrating an example second inaudible frequency signal used in the inaudible frequency communication according to various embodiments.

Referring to FIG. 14, the second inaudible frequency signal may be obtained by removing signals of the high frequency band, which is beyond the audible frequency band, and then generating two signal pulses in the corresponding high frequency band.

Figure 15:
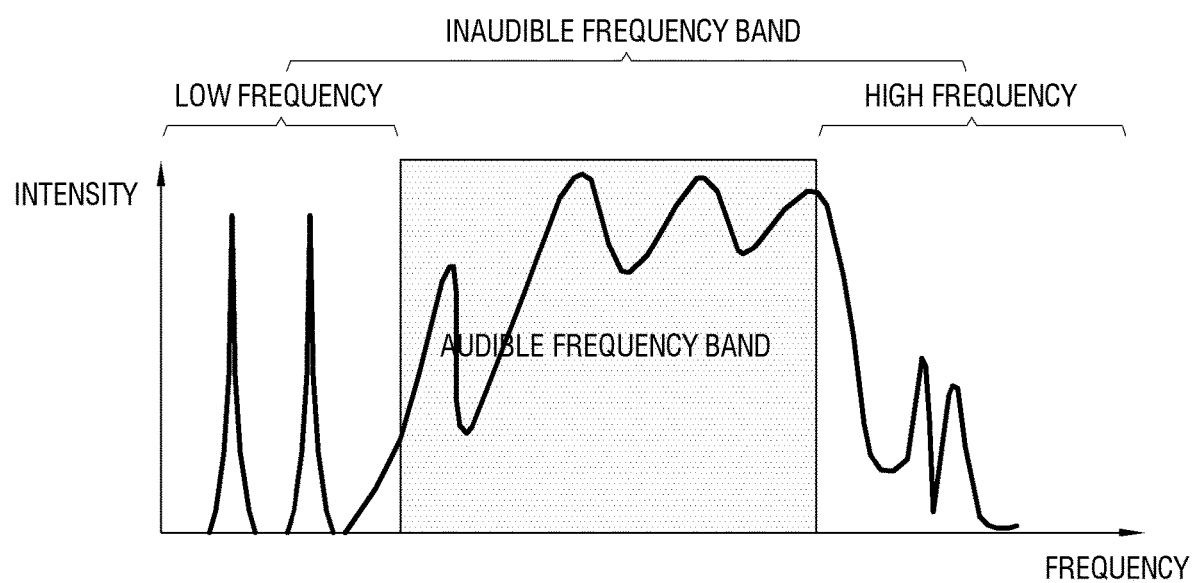
FIG. 15 is a graph illustrating an example third inaudible frequency signal used in the inaudible frequency communication according to various embodiments.

Referring to FIG. 15, the third inaudible frequency signal may be obtained by removing signals of the low frequency band, which is beyond the audible frequency band, and then generating two signal pulses in the corresponding low frequency band.

Figure 16:
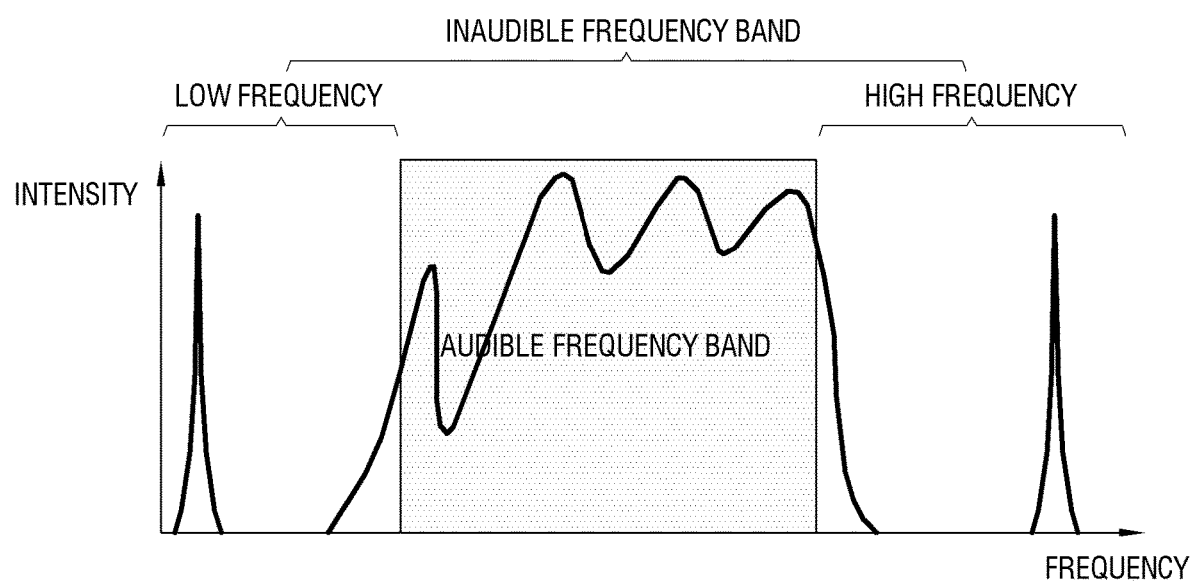
FIG. 16 is a graph illustrating an example fourth inaudible frequency signal used in the inaudible frequency communication according to various embodiments.

Referring to FIG. 16, the fourth inaudible frequency signal may be obtained by removing signals of the low and high frequency bands, which are beyond the audible frequency band, and then generating one signal pulse in each of the corresponding low and high frequency bands. In this case, the generated fourth inaudible frequency signal may be generated by setting a band, of which a frequency has the largest difference from the audible frequency within the usable frequency band, as an initial value.

When a desired operation is not carried out by the output inaudible frequency signal, the electronic apparatus 1 may change the generated frequency band into another inaudible frequency band or the audible frequency band and generate and output a corresponding frequency signal again.

Referring back to FIG. 5, at operation 15, the first to fourth external apparatuses, which obtain the second sound S2, may feed the second sound information S2-1, S2-2, S2-3 and S2-4 obtained together with their own identification information OD1, OD2, OD3 and OD4 back to the electronic apparatus 1. In this case, the first to fourth external apparatuses may output the second sound information S2-1, S2-2, S2-3 and S2-4 at inaudible frequencies (e.g. 20 kHz, 21 kHz and 22 kHz), which do not overlap with the inaudible frequency (e.g. 18 kHz) of the second sound, through the sound output unit or through the interface portion for a bypass.

Figure 17:
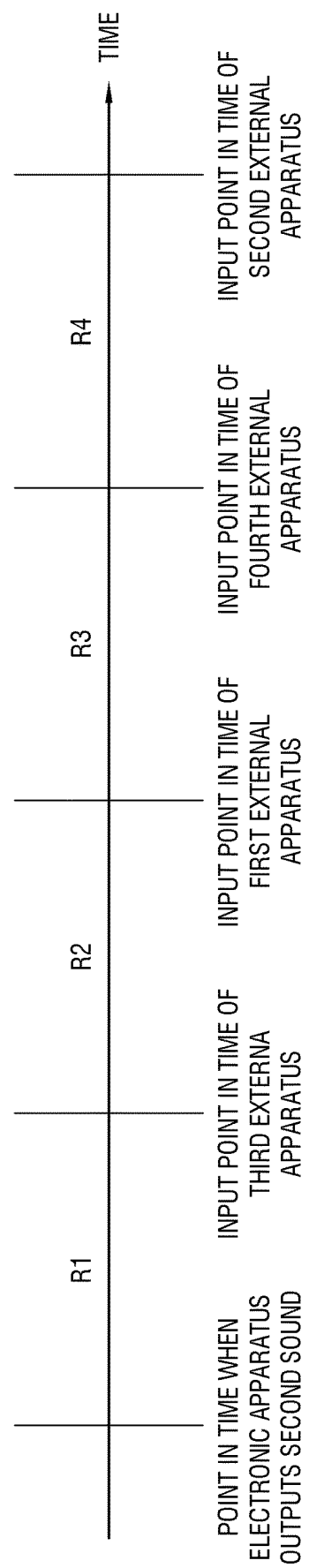
FIG. 17 is a diagram illustrating an example pattern of points in time when a second sound of an electronic apparatus is input to external apparatuses according to various embodiments.
Figure 20:
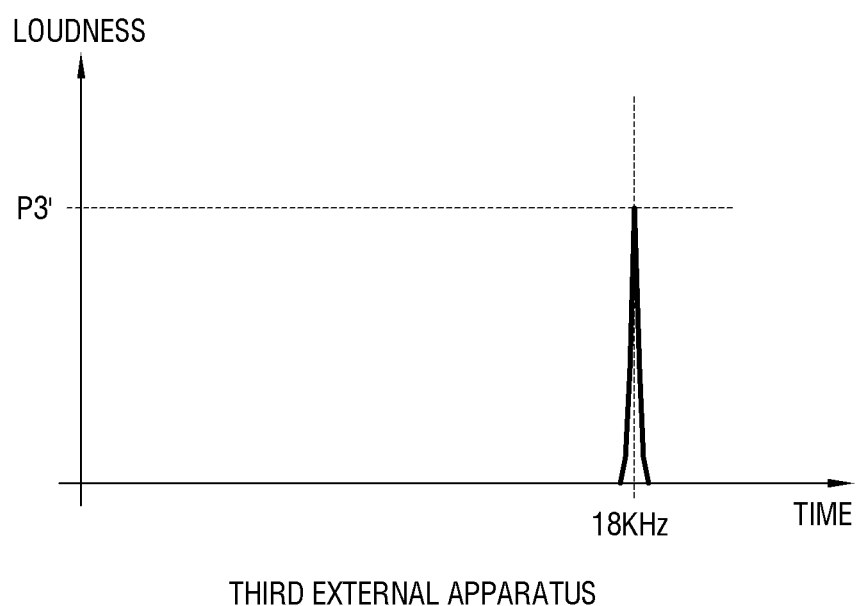
FIG. 20 is a graph illustrating an example second signal characteristic waveform of a second sound S2-3 input to a third external apparatus according to various embodiments.
Figure 21:
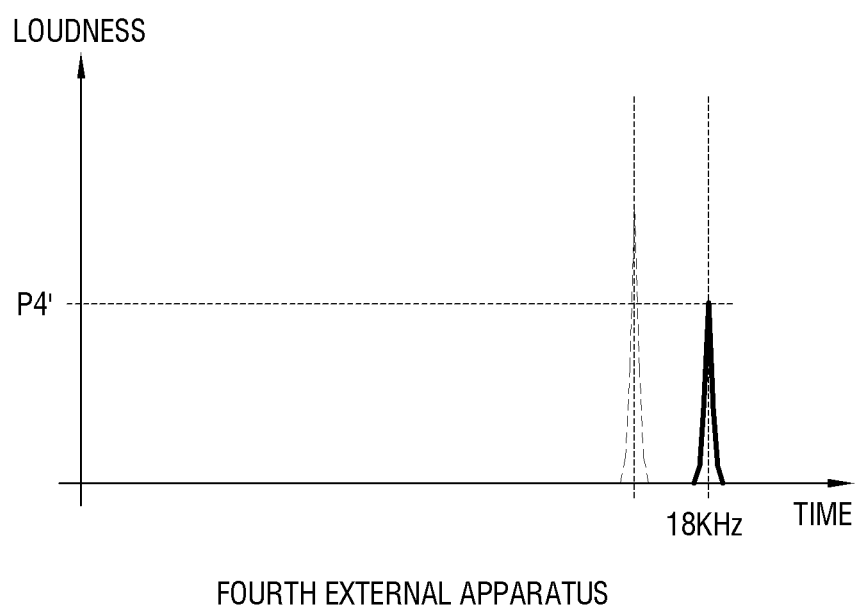
FIG. 21 is a graph illustrating an example second signal characteristic waveform of a second sound S2-4 input to a fourth external apparatus according to various embodiments.
Figure 22:
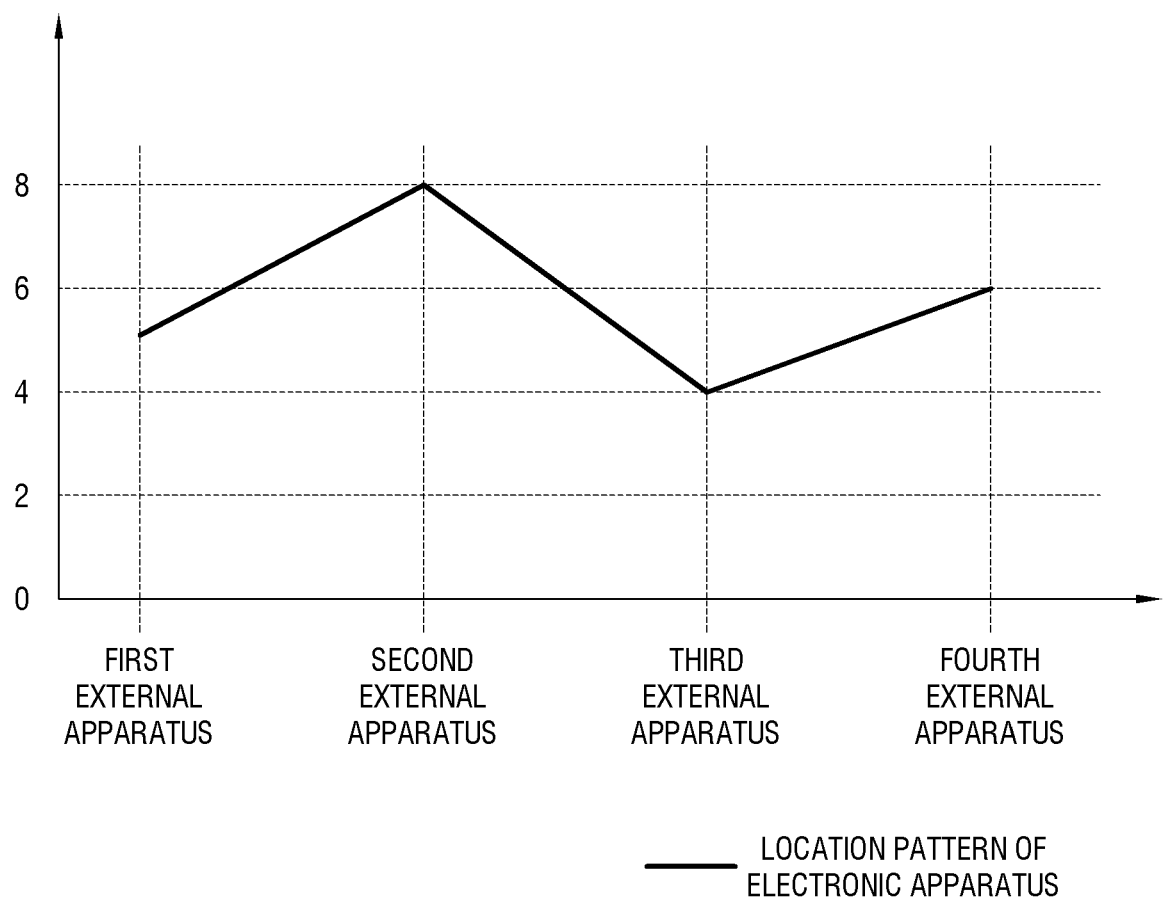
FIG. 22 is a graph illustrating an example second location pattern generated based on second signal characteristics of the second sounds according to various embodiments.

FIG. 17 is a diagram illustrating an example pattern of points in time when the second sound S2 of the electronic apparatus 1 is input to the first to fourth external apparatuses according to various embodiments, FIGS. 18, 19, 20 and 21 are graphs illustrating example second signal characteristic waveforms of the second sound information S2-1, S2-2, S2-3 and S2-4 input to the first to fourth external apparatuses, and FIG. 22 is a graph illustrating an example second location pattern generated based on the second signal characteristics of the second sounds S2-1, S2-2, S2-3 and S2-4 according to various embodiments.

Referring to FIG. 17, points in time when the second sound S2 is input to the first to fourth external apparatuses may be sequenced in order of distances from the object SO, e.g., in order of the third external apparatus, the first external apparatus, the fourth external apparatus and the second external apparatus.

Figure 18:
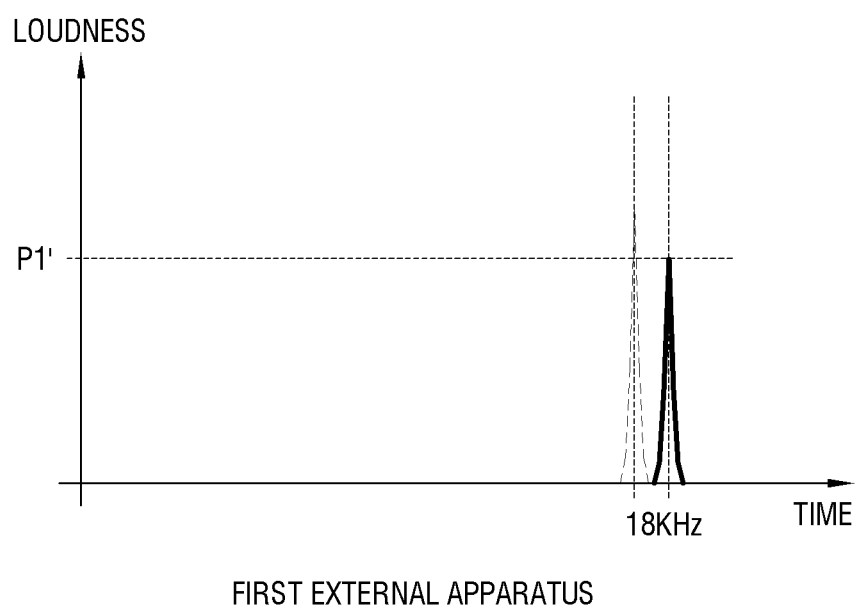
FIG. 18 is a graph illustrating an example second signal characteristic waveform of a second sound S2-1 input to a first external apparatus according to various embodiments.

Referring to FIG. 18, the first external apparatus may receive the second sound S2 having the loudness P1' and having the inaudible frequency of 18 kHz output from the electronic apparatus 1.

Figure 19:
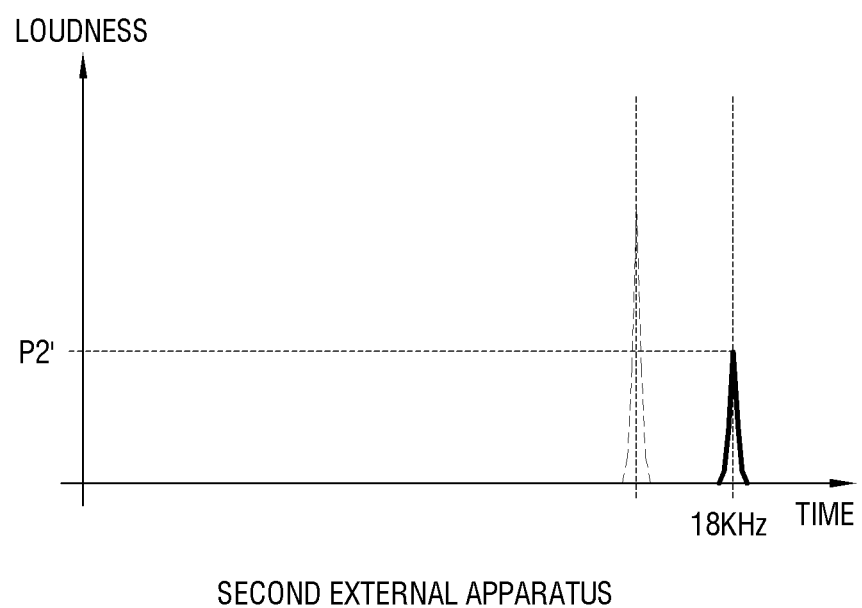
FIG. 19 is a graph illustrating an example second signal characteristic waveform of a second sound S2-2 input to a second external apparatus according to various embodiments.

Referring to FIG. 19, the second external apparatus may receive the second sound S2 having the loudness P2' and having the inaudible frequency of 18 kHz output from the electronic apparatus 1.

Referring to FIG. 20, the third external apparatus may receive the second sound S2 having the loudness P3' and having the inaudible frequency of 18 kHz output from the electronic apparatus 1.

Referring to FIG. 21, the third external apparatus may receive the second sound S2 having the loudness P4' and having the inaudible frequency of 18 kHz output from the electronic apparatus 1.

Referring to FIGS. 18, 19, 20 and 21, the second sound S2 reaches more quickly with a higher volume level in order of the third external apparatus, the first external apparatus, the fourth external apparatus, and the second external apparatus.

Referring to FIG. 22, the second location pattern based on the input points in time and the loudness of the second sound S2 shows that the object SO is located closest to the third external apparatus and farthest away from the second external apparatus. Through the second location pattern, it is possible to identify relative locations between the electronic apparatus 1 and the first to fourth external apparatuses.

Referring back to FIG. 5, at operation 16, the electronic apparatus 1 identifies the relative locations between the electronic apparatus 1 and the first to fourth external apparatuses, and between the object SO and the first to fourth external apparatuses, based on the first location pattern and the second location pattern like as shown in FIG. 11 and FIG. 22. In other words, the electronic apparatus 1 may use differences p1-P1', p2-P2', p3-P3' and p4-P4' in the volume level to thereby obtain the relative distance differences of the electronic apparatus 1 and the object SO with respect to the first to fourth external apparatuses. Of course, the electronic apparatus 1 may also obtain information about the relative distance difference of the electronic apparatus 1 and the object SO with respect to the first to fourth external apparatuses based on difference in the sound input point in time, difference in the noise level, difference in the noise frequency as well as the volume level among the first and second signal characteristics.

Figure 23:
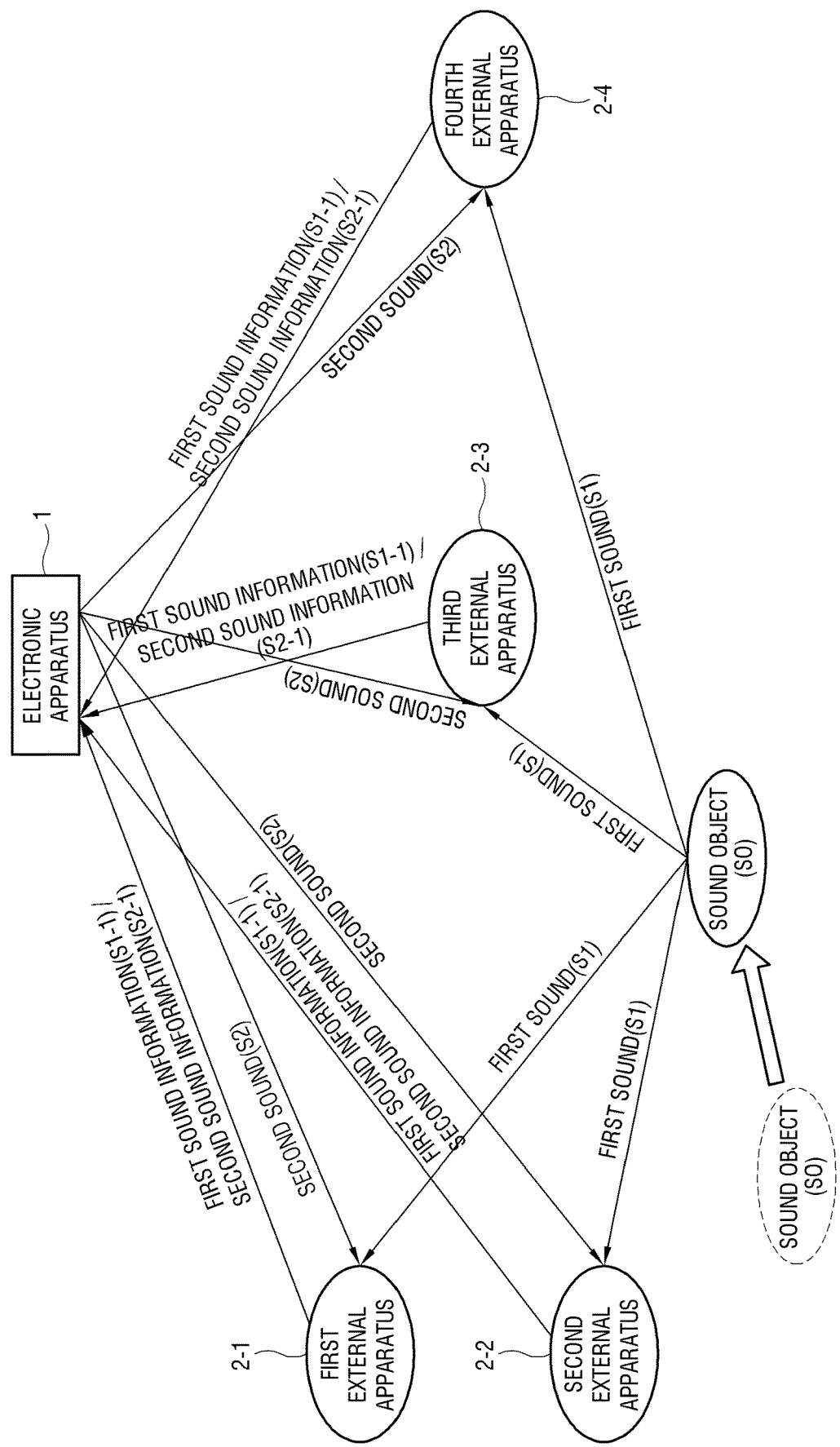
FIG. 23 is a diagram illustrating example placement of an electronic apparatus, external apparatuses and an object according to various embodiments.

FIG. 23 is a diagram illustrating example placement of the electronic apparatus 1, the external apparatuses 2-1~2-4 and the object SO according to various embodiments.

Referring to FIG. 23, the object SO may not be stationarily located but move toward the third external apparatus. In this case, the electronic apparatus 1 may trace a moving track of the object SO in real time while the object SO is moving.

Figure 24:
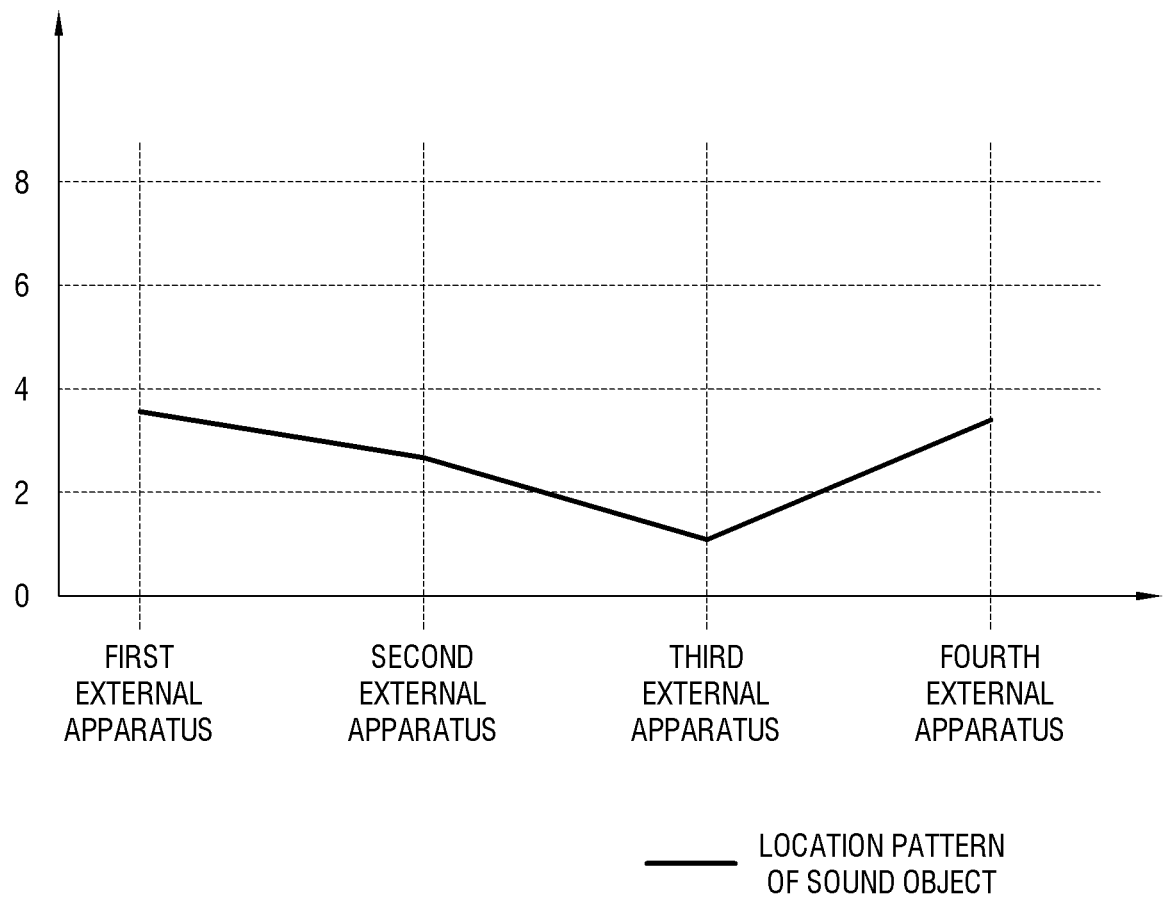
FIG. 24 is a graph illustrating an example first location pattern in a state that an object and external apparatuses are moved according to various embodiments.
Figure 25:
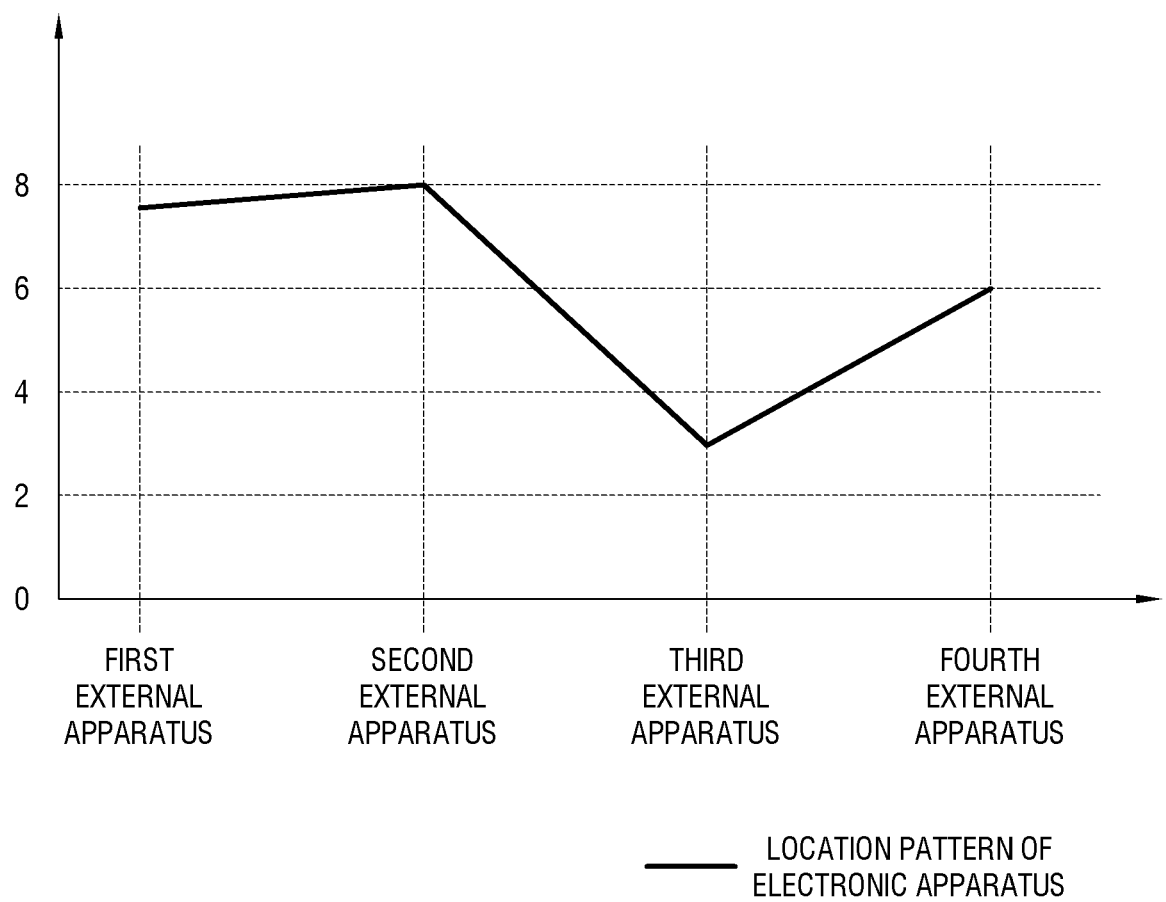
FIG. 25 is a graph illustrating an example second location pattern in a state that an object and external apparatuses are moved according to various embodiments.

FIG. 24 and FIG. 25 are graphs illustrating example first and second location patterns in a state that the object SO and the first to fourth external apparatuses are moved according to various embodiments. In this case, the first location pattern and the second location pattern may be generated by the foregoing method based on the operations 11-16.

Referring to FIG. 24, the object SO moves approaching the third external apparatus.

Referring to FIG. 25, as compared with the pattern of FIG. 22 corresponding to the embodiment of FIG. 4, the first external apparatus is moved away from the electronic apparatus 1, the third external apparatus is moved a little near to the electronic apparatus 1, and the distances of the second and fourth external apparatuses are not much changed.

The electronic apparatus 1 according the disclosure may take all of the relative locations between the object SO and the first to fourth external apparatuses and the relative locations between the electronic apparatus 1 and the first to fourth external apparatuses into account, and thus easily identify the relative locations of the object SO even though the locations of the object SO and/or the first to fourth external apparatuses are changed.

Figure 26:
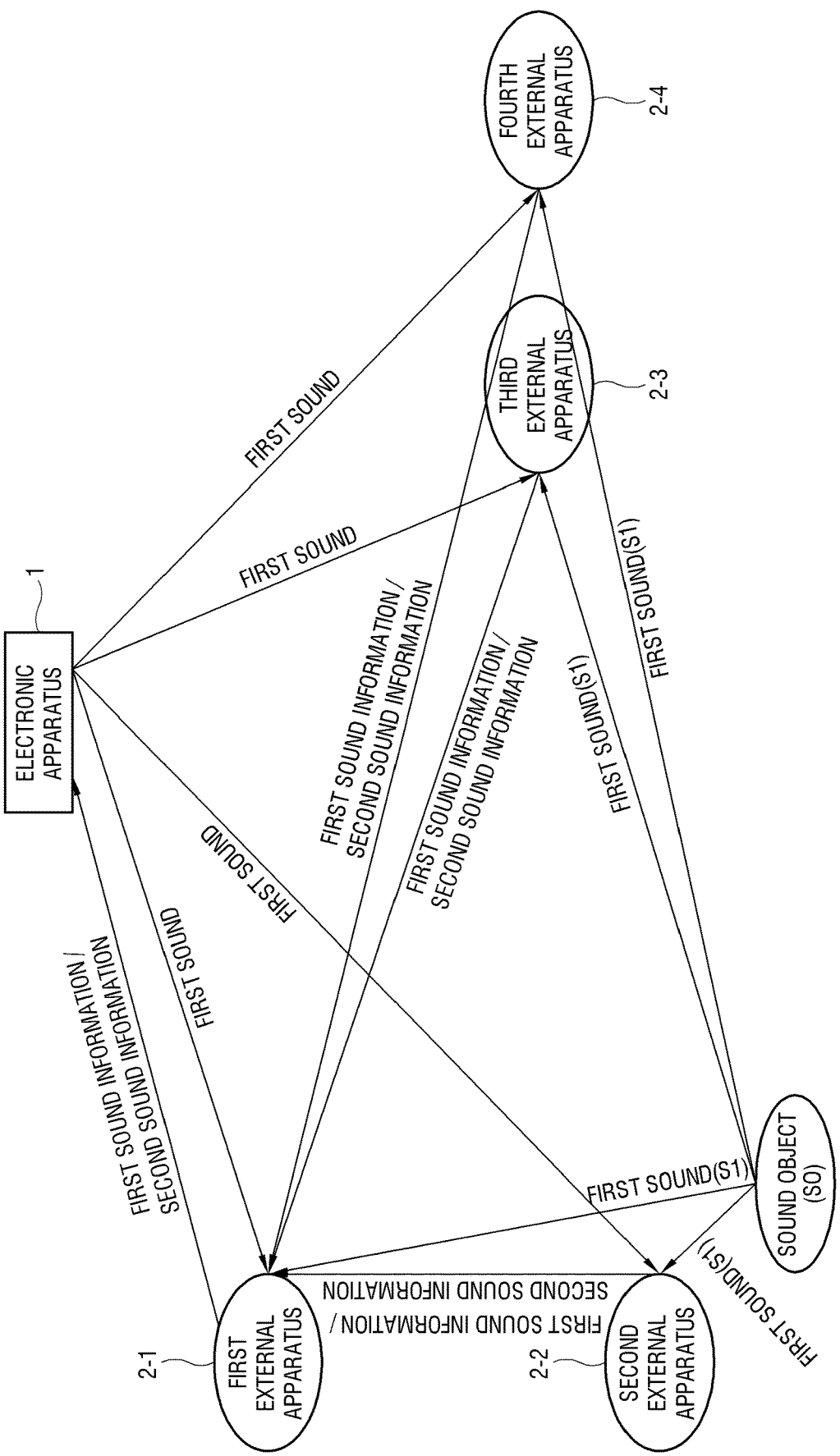
FIG. 26 is a diagram illustrating example placement of an electronic apparatus, external apparatuses and an object according to various embodiments.

FIG. 26 is a diagram illustrating example placement of the electronic apparatus 1, the first to fourth external apparatuses 2-1~2-4 and the object SO according to various embodiments.

Referring to FIG. 26, there are the electronic apparatus 1 and for example four first to fourth external apparatuses 2-1~2-4 within a predetermined space. The object SO is making or outputting the first sound S1.

When the object SO makes or outputs the first sound S1, the first to fourth external apparatuses 2-1~2-4 may obtain the first sound S1 through the second microphone 23.

The second to fourth external apparatuses 2-2~2-4 may allow the first sound information S1-2, S1-3 and S1-4 to detour to the first external apparatus through the second interface portion 21. Each of the second to fourth external apparatuses 2-2~2-4 may generate a unique inaudible frequency corresponding to the first signal characteristics, e.g., the loudness, the response time, the noise level and the noise frequency of the first sound S1, and output the unique inaudible frequency through the second sound output unit 22.

The first sound information may include each identification information of the first sound S1 and the second to fourth external apparatuses 2-2~2-4.

The first external apparatus may transmit the first sound information, obtained from the second to fourth external apparatuses 2-2~2-4 and/or the object SO to the electronic apparatus 1.

The electronic apparatus 1 may output the second sound S2 of the inaudible frequency signal. The output second sound S2 may be input to the first to fourth external apparatuses.

The second to fourth external apparatuses 2-2~2-4 may transmit the second sound information S2-2, S2-3 and S2-4, which includes the input second sound S2 and the identification information, to the first external apparatus.

The first external apparatus may transmit the obtained first sound information S1-1, S1-2, S1-3 and S1-4 and second sound information S2-1, S2-2, S2-3 and S2-4 to the electronic apparatus 1 through the second interface portion 21.

The electronic apparatus 1 may detect the first and second signal characteristics based on the four first sound information S1-1, S1-2, S1-3 and S1-4 and the four second sound information S2-1, S2-2, S2-3 and S2-4 received from the four first to fourth external apparatuses 2-1~2-4, and identify the relative location of the object SO based on the detected first and second signal characteristics.

Below, a method of identifying the relative location of the object SO according to various embodiments will be described in greater detail.

Figure 27:
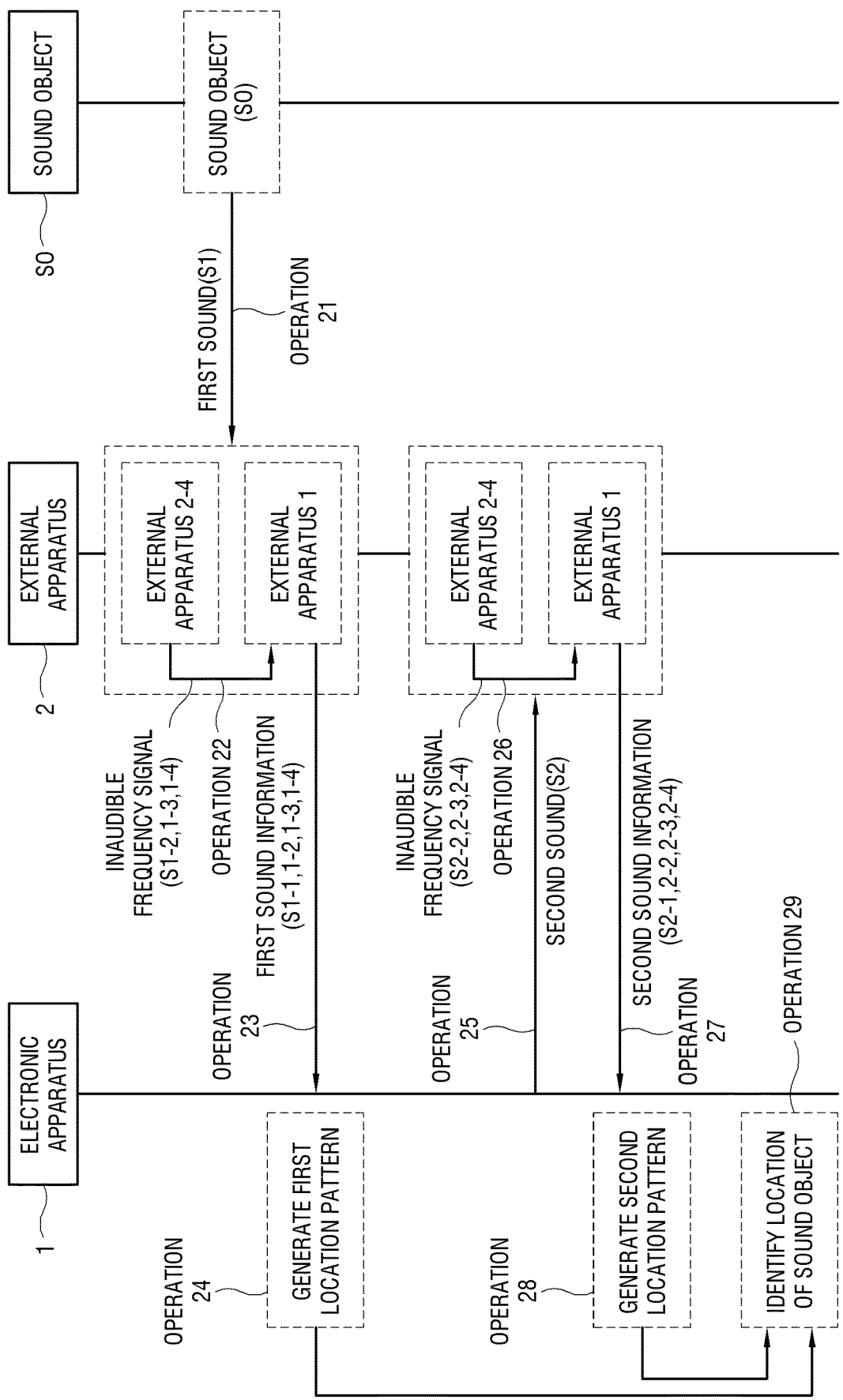
FIG. 27 is a signal flow diagram illustrating an example method of controlling the electronic apparatus according to various embodiments.

FIG. 27 is a signal flow diagram illustrating an example method of controlling the electronic apparatus 1 according to various embodiments.

At operation 21, the object SO makes or outputs the first sound S1. The made or output first sound S1 may be input to the microphones of the surrounding first to fourth external apparatuses.

At operation 22, when the first sound S1 is input to the second to fourth external apparatuses, the second to fourth external apparatuses may perform an event of generating the first sound information S1-2, S1-3 and S1-4 based on the first sound S1, and transmitting the first sound information S1-2, S1-3 and S1-4 to the first external apparatus through the interface portion, for example, Wi-Fi. When the first sound S1 is input to the second to fourth external apparatuses, the second to fourth external apparatuses may output the first inaudible frequency signals, which do not overlap with each other, based on the first signal characteristics of the first sound S1 through the sound output unit.

The first sound information may include the first sound S1 and the identification information of the second to fourth external apparatuses. The identification information may include one of the IDs or names of the second to fourth external apparatuses, to be transmitted to the electronic apparatus 1 by a hash value. The identification information may include a unique inaudible frequency and/or a noise frequency generated and output by the second to fourth external apparatuses. Noise may refer, for example, to pulses between the inaudible frequencies.

FIGS. 28, 29, 30 and 31 are graphs illustrating example first signal characteristic waveforms of first sounds S1-1, S1-2, S1-3 and S1-4 input to the first external apparatus or output from the second to fourth external apparatuses according to various embodiments.

Figure 28:
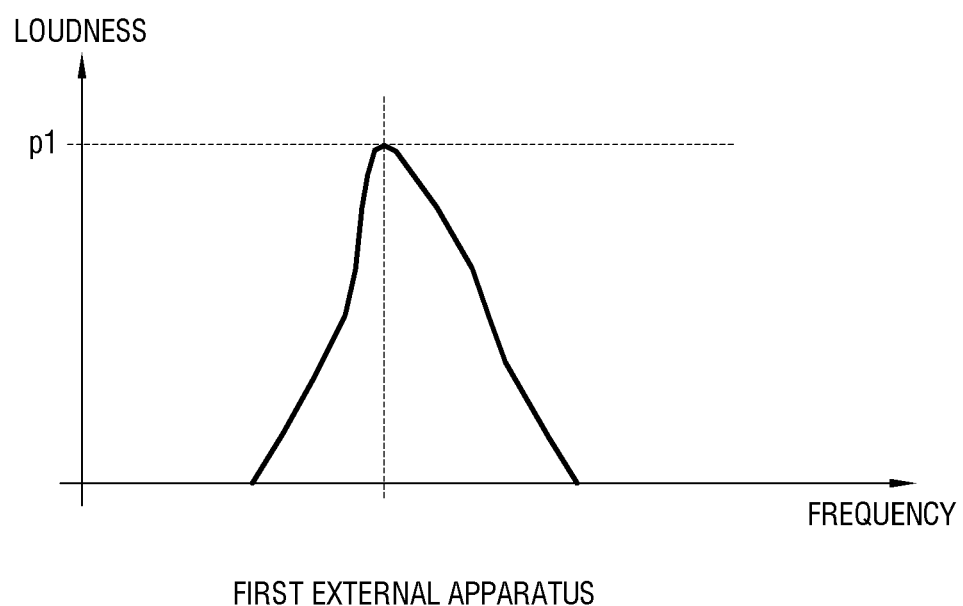
FIG. 28 is a graph illustrating an example first signal characteristic waveform of a first sound S1-1 input to a first external apparatus according to various embodiments.

Referring to FIG. 28, the first external apparatus may receive the first sound S1 having the loudness p1 output from the object SO.

Figure 29:
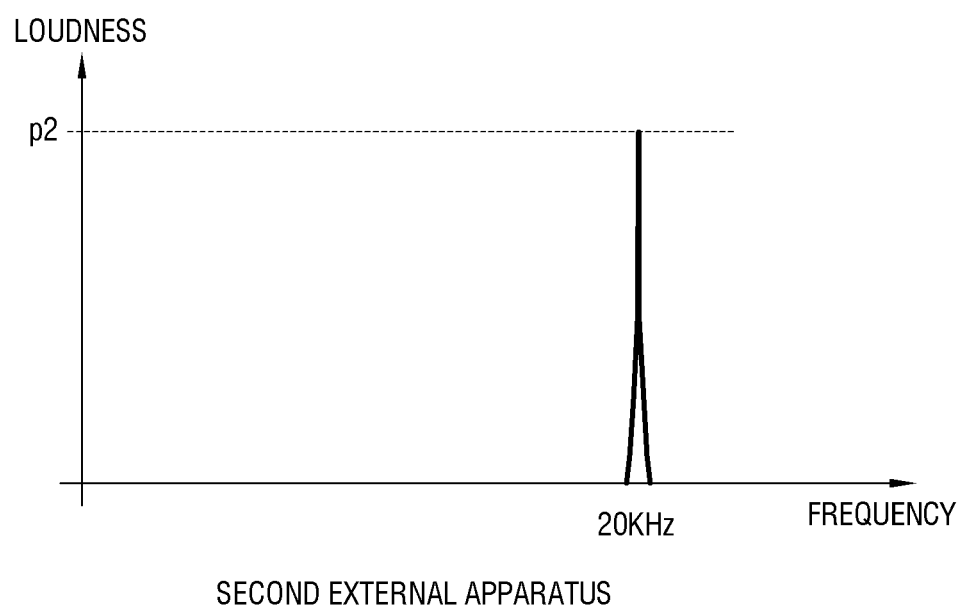
FIG. 29 is a graph illustrating an example first signal characteristic waveform of a first sound S1-2 output from a second external apparatus according to various embodiments.

Referring to FIG. 29, the second external apparatus may output the first inaudible frequency signal having the loudness p2 at 20 kHz output from the object SO.

Figure 30:
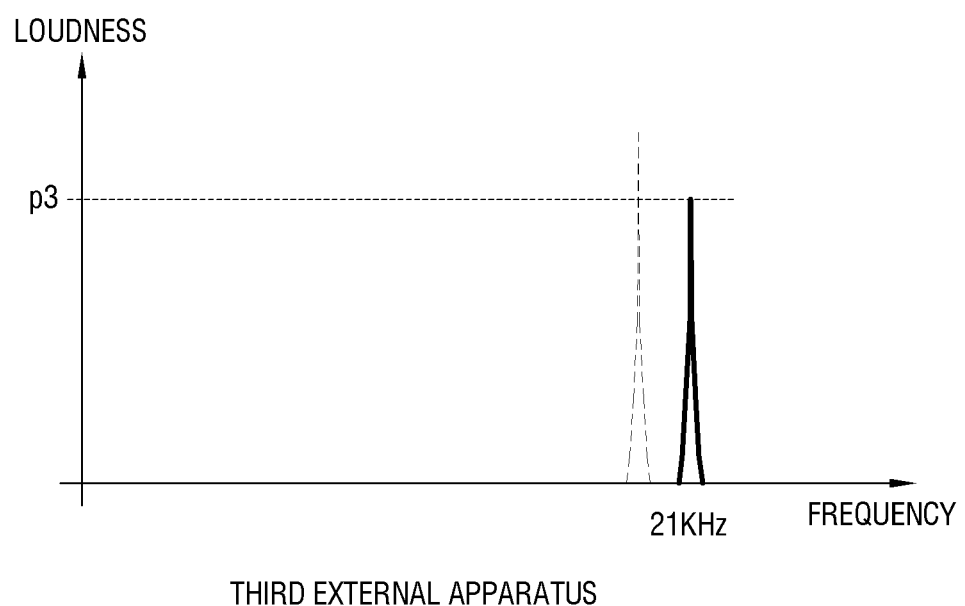
FIG. 30 is a graph illustrating an example first signal characteristic waveform of a first sound S1-3 output from a third external apparatus according to various embodiments.

Referring to FIG. 30, the third external apparatus may output the first inaudible frequency signal having the loudness p3 at 21 kHz output from the object SO.

Figure 31:
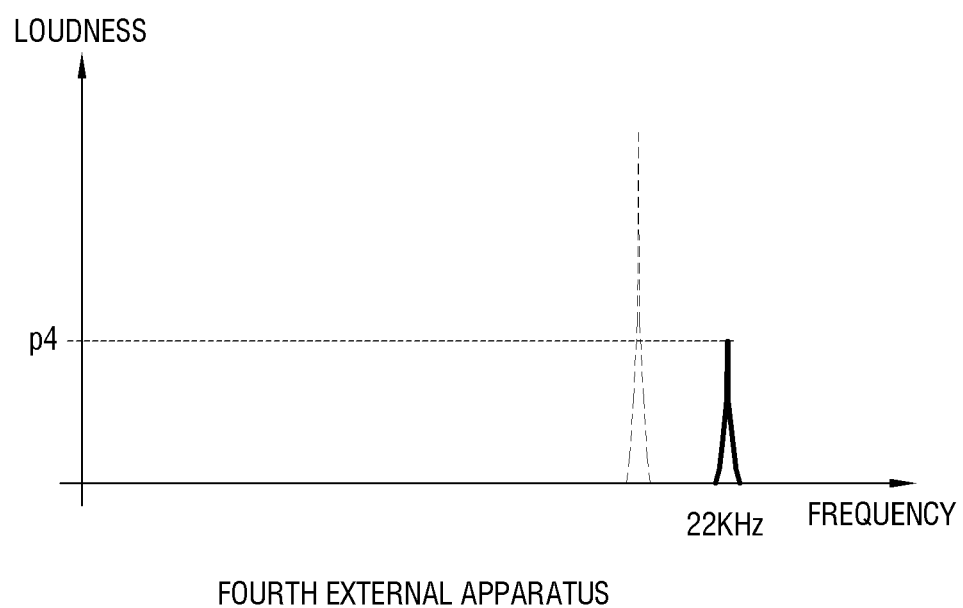
FIG. 31 is a graph illustrating an example first signal characteristic waveform of a first sound S1-4 output from a fourth external apparatus according to various embodiments.

Referring to FIG. 31, the fourth external apparatus may output the first inaudible frequency signal having the loudness p4 at 22 kHz output from the object SO.

Referring to FIGS. 29, 30 and 31, the second inaudible frequency signals of the second to fourth external apparatuses, which are converted and output to the first external apparatus, are decreased in loudness in order of the second external apparatus, the third external apparatus, and the fourth external apparatus. Further, the second external apparatus, the third external apparatus, and the fourth external apparatus have different output inaudible frequencies of 20 kHz, 21 kHz and 22 kHz, respectively.

Referring back to FIG. 27, at operation 23, the first external apparatus may transmit the first sound information S1-1 obtained from the object SO and the first sound information S1-2, S1-3 and S1-4 obtained from the second to fourth external apparatuses to the electronic apparatus 1 through the interface portion.

At operation 24, the electronic apparatus 1 may detect the first signal characteristics using four pieces of first sound information S1-1, S1-2, S1-3 and S1-4 received from four first to fourth external apparatuses, and generate the first location pattern (see FIG. 11) based on the detected first signal characteristics.

At operation 25, the electronic apparatus 1 may generate the first location pattern of the object SO based on the first sound information S1-1, S1-2, S1-3 and S14, and output the second sound S2 having the inaudible frequency through the sound output unit. For example, as shown in FIG. 12, the second sound S2 having the inaudible frequency may be output as the second sound S2 having the loudness p0 at a frequency of 18 kHz. The output second sound S2 having the inaudible frequency may be input to the surrounding first to fourth external apparatuses.

At operation 26, when the second sound S2 is input as the inaudible frequency signal to the second to fourth external apparatuses, the second to fourth external apparatuses may perform an event of generating the second sound information S2-2, S2-3 and S2-4 based on the second sound S2, and transmitting the second sound information S2-2, S2-3 and S2-4 to the first external apparatus through the interface portion, for example, Wi-Fi. When the second sound S2 is input to the second to fourth external apparatuses, the second to fourth external apparatuses may output the second inaudible frequency signals, which correspond to the second sound S2 and do not overlap with each other, through the sound output unit.

The second sound information may include the second sound S2 and the identification information of the second to fourth external apparatuses. The identification information may include one of the IDs or names of the second to fourth external apparatuses, to be transmitted to the first external apparatus by a hash value. The identification information may include a unique inaudible frequency and/or a noise frequency generated and output by the second to fourth external apparatuses.

FIGS. 32, 33, 34 and 35 are graphs illustrating example second signal characteristic waveforms of second sounds S2-1, S2-2, S2-3 and S2-4 input to the first external apparatus or output from the second to fourth external apparatuses according to various embodiments.

Figure 32:
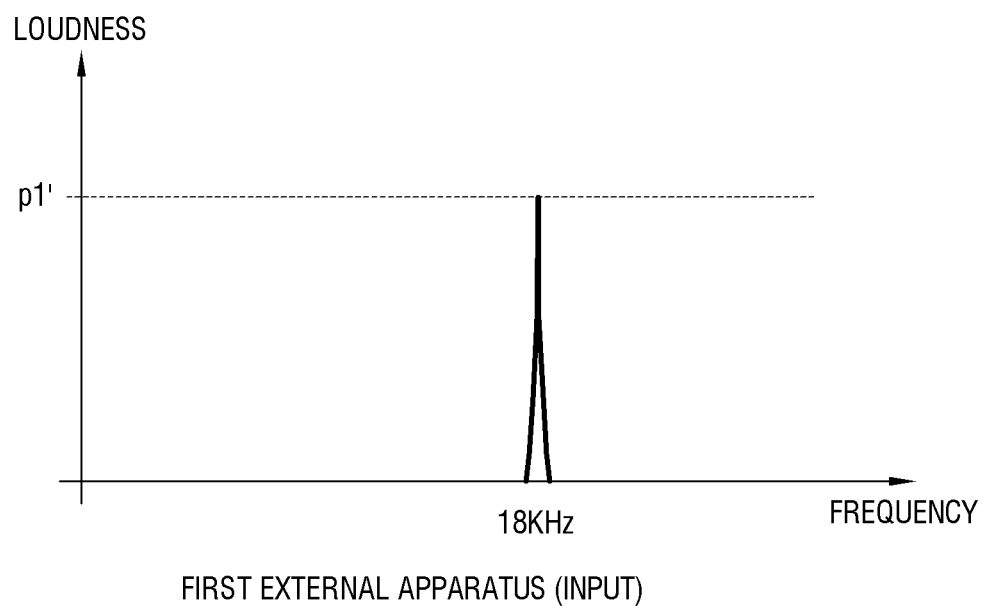
FIG. 32 is a graph illustrating an example second signal characteristic waveform of a second sound S2-1 input to a first external apparatus according to various embodiments.

Referring to FIG. 32, the first external apparatus may receive the second inaudible frequency signal having the loudness p1' at 18 kHz output from the electronic apparatus 1.

Figure 33:
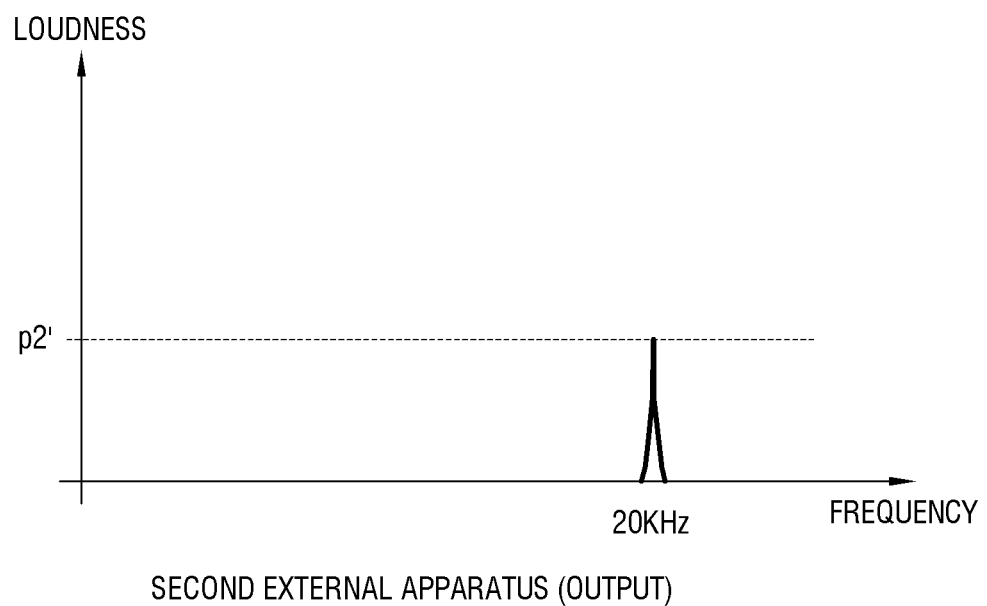
FIG. 33 is a graph illustrating an example second signal characteristic waveform of a second sound S2-2 output from a second external apparatus according to various embodiments.

Referring to FIG. 33, the second external apparatus may output the second inaudible frequency signal having the loudness p2' at 20 kHz output from the object SO.

Figure 34:
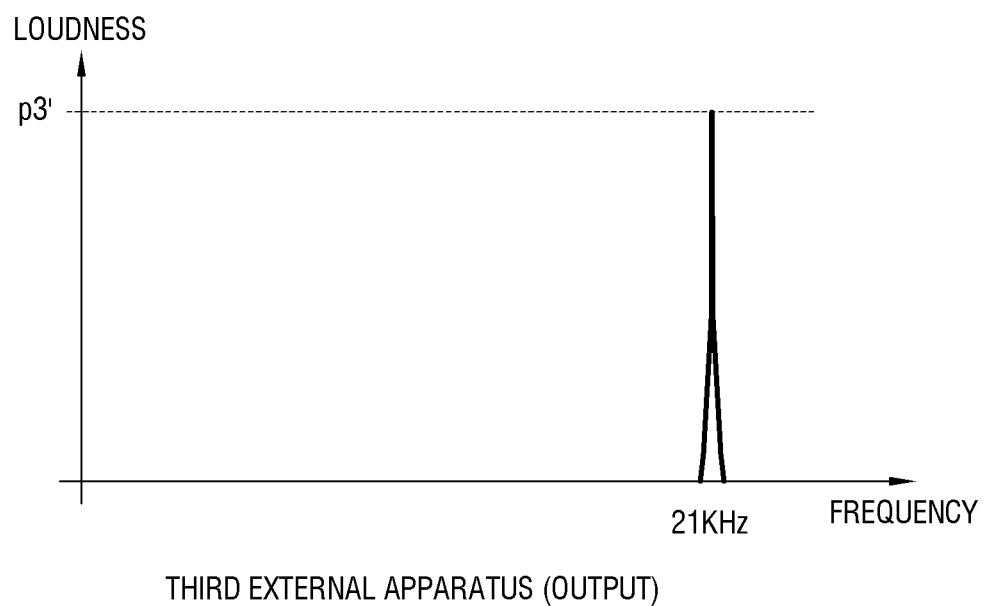
FIG. 34 is a graph illustrating an example second signal characteristic waveform of a second sound S2-3 output from a third external apparatus according to various embodiments.

Referring to FIG. 34, the third external apparatus may output the second inaudible frequency signal having the loudness p3' at 21 kHz output from the object SO.

Figure 35:
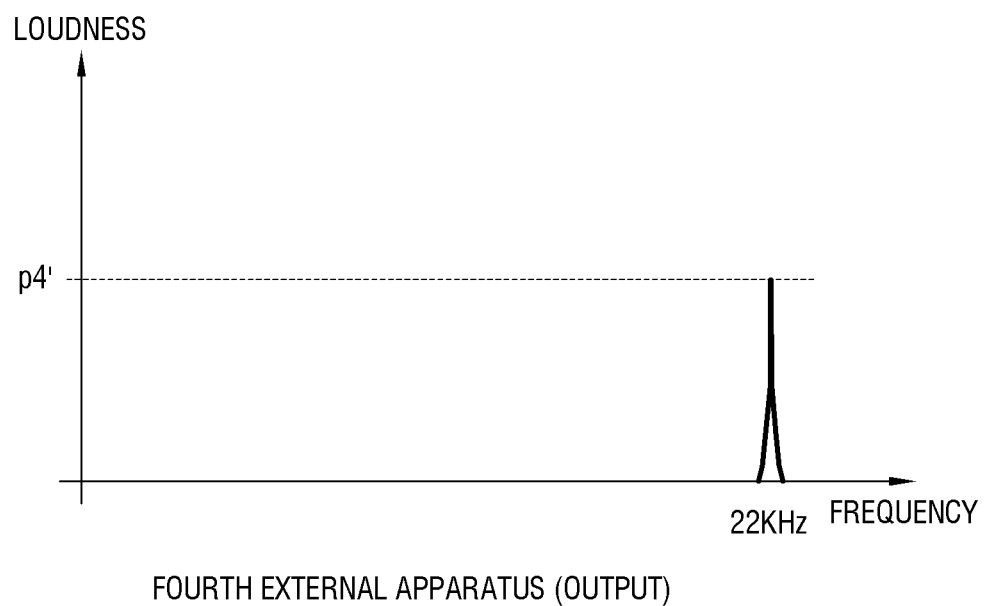
FIG. 35 is a graph illustrating an example second signal characteristic waveform of a second sound S2-4 output from a fourth external apparatus according to various embodiments.

Referring to FIG. 35, the fourth external apparatus may output the second inaudible frequency signal having the loudness p4' at 22 kHz output from the object SO.

Referring to FIGS. 33, 34 and 35, the second inaudible frequency signals of the second to fourth external apparatuses, which are converted and output to the first external apparatus, are decreased in loudness in order of the third external apparatus, the fourth external apparatus and the second external apparatus. Further, the second external apparatus, the third external apparatus, and the fourth external apparatus have different output inaudible frequencies of 21 kHz, 22 kHz and 24 kHz, respectively.

Referring back to FIG. 27, at operation 27, the first external apparatus, which obtains the second sound information S2-1~2-4, may feed the second sound information S2-1, S2-2, S2-3 and S2-4 back to the electronic apparatus 1.

At operation 28, the electronic apparatus 1 may detect the second signal characteristics using four pieces of second sound information S2-1, S2-2, S2-3 and S2-4 received from four first to fourth external apparatuses, and generate the second location pattern (see FIG. 22) based on the detected second signal characteristics.

At operation 29, the electronic apparatus 1 may identify the relative locations between the electronic apparatus 1 and the first to fourth external apparatuses and between the object SO and the first to fourth external apparatuses, based on the first location pattern and the second location pattern generated in the operation 24 and operation 28.

As described above, a sound signal is transmitted to the electronic apparatus 1 by various methods according to whether hardware specifications, e.g., a microphone, a sound output unit, and an interface are present in the electronic apparatus 1 and the first to fourth external apparatuses.

Figure 36:
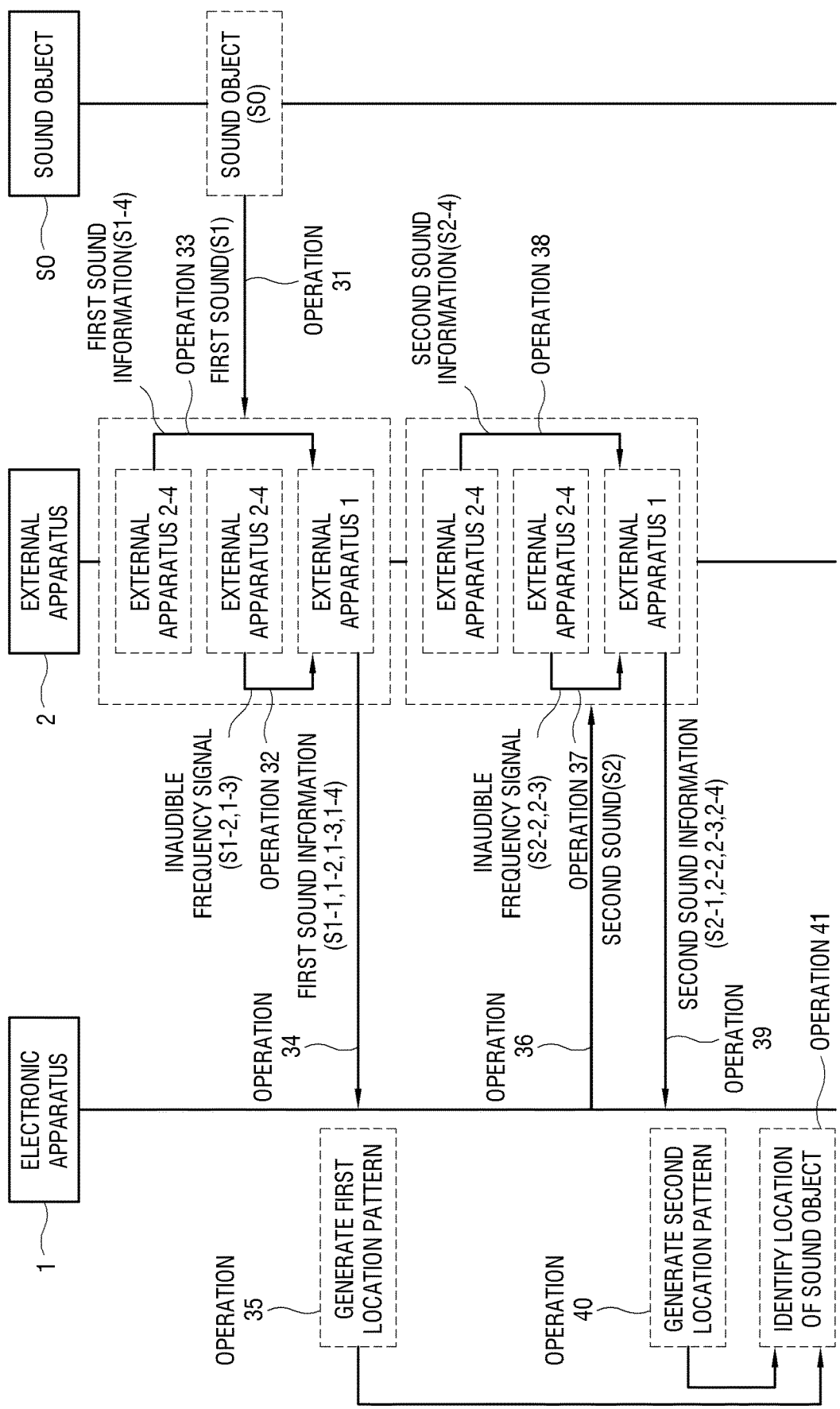
FIG. 36 is a signal flow diagram illustrating an example method of controlling an electronic apparatus according to various embodiments.

FIG. 36 is a signal flow diagram illustrating an example method of controlling the electronic apparatus 1 according to various embodiments.

At operation 31, the object SO makes or outputs the first sound S1. Such a made or output first sound S1 may be input to each microphone of the surrounding first to fourth external apparatuses.

At operation 32, when the first sound S1 is input to the second to third external apparatuses, the second to third external apparatuses may output the first inaudible frequency signals, which correspond to the first sound S1 but do not overlap with each other, together with their identification information through the sound output unit. Here, the identification information may include the unique inaudible frequency and/or the noise frequency generated and output by the second to third external apparatuses.

At operation 33, when the first sound S1 is input to the fourth external apparatus, the fourth external apparatus may perform an event of generating the first sound information S1-4 based on the first sound S1 and transmitting the first sound information S1-4 to the first external apparatus through the interface portion, for example, Wi-Fi. Here, the identification information may include one of the ID or name of the fourth external apparatuses, to be transmitted to the first external apparatus by a hash value.

At operation 34, the first external apparatus may transmit the first sound information S1-1 obtained from the object SO and the first sound information S1-2, S1-3 and S1-4 obtained from the second to fourth external apparatuses to the electronic apparatus 1 through the interface portion.

At operation 35, the electronic apparatus 1 detects the first signal characteristics using four pieces of first sound information S1-1, S1-2, S1-3 and S1-4 received from four first to fourth external apparatuses, and generates the first location pattern (see FIG. 11) based on the detected first signal characteristics.

At operation 36, the electronic apparatus 1 may generate the first location pattern of the object SO based on the first sound information S1-1, S1-2, S1-3 and S1-4, and output the second sound S2 having the inaudible frequency through the sound output unit. For example, as shown in FIG. 12, the second sound S2 having the inaudible frequency may be output as the second sound S2 having the loudness p0 at a frequency of 18 kHz. The output second sound S2 having the inaudible frequency may be input to the surrounding first to fourth external apparatuses.

At operation 37, when the second sound S2 is input to the second to third external apparatuses, the second to third external apparatuses may output the second inaudible frequency signals, which correspond to the second sound S2 but do not overlap with each other, together with the identification information through the sound output unit. The identification information may include the unique inaudible frequency and/or the noise frequency generated and output by the second to third external apparatuses.

At operation 38, when the second sound S2 is input to the fourth external apparatus, the fourth external apparatus may perform an event of generating the second sound information S2-4 based on the second sound S2 and transmitting the second sound information S2-4 to the first external apparatus through the interface portion, for example, Wi-Fi. The identification information may include one of the ID or name of the fourth external apparatuses, to be transmitted to the first external apparatus by a hash value.

At operation 39, the first external apparatus may transmit the second sound information S2-1 obtained from the object SO and the second sound information S2-2, S2-3 and S2-4 obtained from the second to fourth external apparatuses to the electronic apparatus 1 through the interface portion.

At operation 40, the electronic apparatus 1 may detect the second signal characteristics using four pieces of second sound information S2-1, S2-2, S2-3 and S2-4 received from four first to fourth external apparatuses, and generate the second location pattern (see FIG. 22) based on the detected second signal characteristics.

At operation 41, the electronic apparatus 1 may identify the relative locations of the electronic apparatus 1 and the object SO with respect to the first to fourth external apparatuses, based on the first location pattern and the second location pattern generated in the Step 35 and Step 40. In other words, the electronic apparatus 1 may use differences p1-p1', p2-p2', p3-p3' and p4-p4' in the volume level to thereby obtain the relative distance differences of the electronic apparatus 1 and the object SO with respect to the first to fourth external apparatuses. Of course, the electronic apparatus 1 may also obtain information about the relative distance difference of the electronic apparatus 1 and the object SO with respect to the first to fourth external apparatuses based on difference in the sound input point in time, difference in the noise level, difference in the noise frequency as well as the loudness of the volume among the first and second signal characteristics.

As described above, some among the first to fourth external apparatuses may selectively use the sound output unit or the interface portion when the sound output unit or the interface portion is not present, or when an obstacle makes it difficult to perform the inaudible frequency communication.

Figure 37:
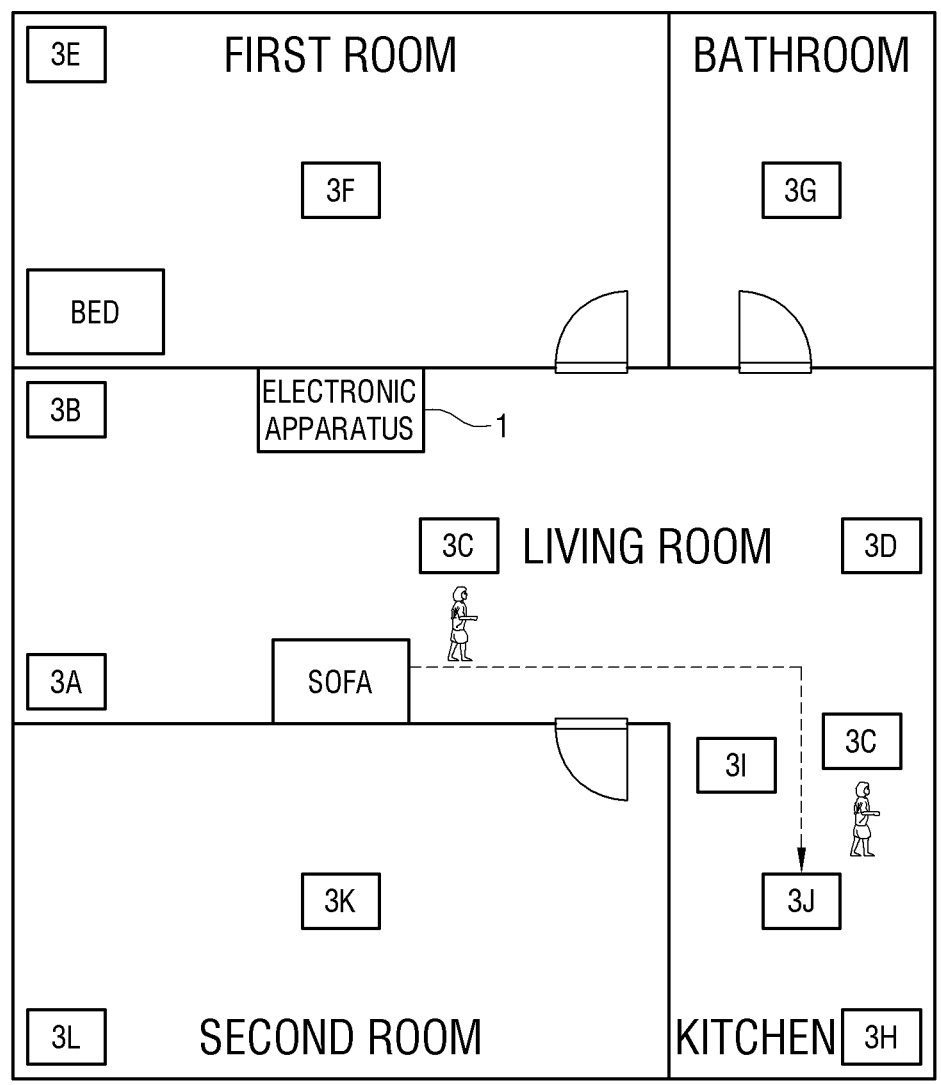
FIG. 37 is a diagram illustrating an example scenario of identifying a location of an object by an electronic apparatus according to various embodiments.

FIG. 37 is a diagram illustrating an example scenario of identifying a location of the object SO by the electronic apparatus 1 according to various embodiments.

The electronic apparatus 1 may include an IoT platform that manages a plurality of IoT apparatuses 3A, 3B, 3C, 3D, 3E, 3F, 3G, 3H, 3I, 3J, 3K and 3L (which may be referred to as apparatuses 3A-3L for convenience) located inside a house and connected through a network.

Referring to FIG. 37, the communication area may be partitioned to include a plurality of sub spaces such as a living room, a first room, a bathroom, a kitchen, and a second room. The plurality of sub spaces may include not only a plurality of two-dimensional space regions but also three-dimensional space regions with upper or lower layers. The plurality of IoT apparatuses 3A~3L may for example, and without limitation, be embodied by a remote controller 3A, an AI speaker 3B, a smartphone 3C and a lighting apparatus 3D which are placed in the living room; an air conditioner 3E and a lighting apparatus 3F which are placed in the first room; a lighting apparatus 3G which is placed in the bathroom; an oven 3H, a refrigerator 3I and a lighting apparatus 3J which are placed in the kitchen; and a lighting apparatus 3K and a computer 3L which are placed in the second room.

Some among the plurality of IoT apparatuses 3A~3L may be stationarily located and previously registered. Further, some among the plurality of IoT apparatuses 3A~3L may be only unidirectionally controlled by the electronic apparatus 1. Therefore, the electronic apparatus 1 may use some among the plurality of IoT apparatuses 3A~3L, which include the microphone, the sound output unit, and the interface portion, to identify a location of a user and control the IoT apparatuses 3A~3L corresponding to the identified location of the user.

In FIG. 37, the electronic apparatus 1 may obtain a first location pattern between a user and a remote controller 3A, an AI speaker 3B and a smartphone 3C, based on first sound information received from the remote controller 3A, the AI speaker 3B and the smartphone 3C which obtain the first sound uttered by the user who is located in a living room. When the electronic apparatus 1 outputs the second sound of the inaudible frequency signal, and the remote controller 3A, the AI speaker 3B and the smartphone 3C obtain the second sound and gives a feedback on the second sound information, the feedback second sound information is used in obtaining a second location pattern between the electronic apparatus 1 and the remote controller 3A, the AI speaker 3B and the smartphone 3C. In result, the electronic apparatus 1 can identify the relative locations between itself and the remote controller 3A, the AI speaker 3B, the smartphone 3C, and the user.

In such a manner, the electronic apparatus 1 can identify that the location of the user is moved toward the refrigerator 3I and the oven 3H which are located in the living room, and automatically control lighting 3J in a kitchen, where the refrigerator 3I and the oven 3H are located, to be turned on/off as the user moves.

Further, the electronic apparatus 1 may identify that a user moves being accompanied by the smartphone 3C. In this case, the electronic apparatus 1 may provide information, which is required based on the location of the user to the smartphone 3C.

According to an embodiment, when a user who is watching a TV at home is moving, the TV may identify the location of the user through external apparatuses capable of inputting/outputting a sound or capable of receiving a sound and transmitting data, for example, a smartphone, a remote controller, an AI speaker and the like household appliances. When a user moves from the TV, the TV may control a volume level based on distances, or control its display direction to swivel according to directions.

According to an embodiment, the TV may effectively cope with strange behavior of a companion animal that has more sensitive auditory sense than a human, while performing the inaudible frequency communication with the external apparatuses at home.

The TV periodically outputs an inaudible frequency signal, and receives the inaudible frequency signal again through various external apparatuses mounted with the microphone, thereby obtaining each inaudible-frequency response time pattern of the external apparatuses in a current TV location.

When there is a cry of a companion animal during the inaudible frequency communication of such a TV, and a crying sound is transmitted from the external apparatuses to the TV, the TV may obtain a location pattern of the companion animal.

The location pattern of the companion animal may be changed into a pattern close to the pattern that has been made by the inaudible frequency sent from the TV when the companion animal continues to make the cry while getting near the TV. In this case, the TV identifies that the companion animal responds to this inaudible frequency to thereby change an inaudible frequency range or inform a user of function release. When the companion animal does not make a cry anymore in response to the change in the inaudible frequency or moves away, it may be identified that the inaudible frequency is suitable.

According to an embodiment, during the inaudible frequency communication between the TV and the remote controller, a user's location with respect to the TV and the remote controller may be identified to control the operation of the TV or the remote controller. The TV outputs the inaudible frequency, and the remote controller obtains the output inaudible frequency and sends it again to the TV, so that TV can detect a location pattern of the remote controller. When a user makes a sound of footsteps or makes a voice, and the remote controller transmits this sound of footsteps or this voice to the TV, the TV can obtain the user's location pattern with respect to the remote controller. In this case, when the user is close to the TV, the microphone of the TV may become activated but the remote controller may become inactivated. For example, in terms of performing the voice recognition, it is possible to prevent and/or reduce confusion and noise caused when the same sound is input to both the microphone of the TV and the microphone of the remote controller.

According to an embodiment, the modulus for identifying the relative locations of the object based on the inaudible frequency communication and the external apparatuses may be embodied by a computer program product stored in the memory 14 as the computer-readable recording medium or a computer program product transmitted and received through network communication. Further, the foregoing modules may be independently or integrally embodied by a computer program.

A computer program according to an embodiment of the disclosure may output the first sound through the sound output unit, obtain the first sound information from the external apparatus that receives the first sound output from the sound output unit, obtain the second sound information from the external apparatus that receives the second sound output from the object, identify the location of the object based on the first signal characteristics and the second signal characteristics respectively detected using the obtained first sound information and second sound information, and execute operation based on the identified location.

As described above, the electronic apparatus according to the disclosure can accurately identify the locations of the electronic apparatus and the object, e.g., a human, an animal or a machine, which make a sound, corresponding to the external apparatus by identifying both the relative location of the object corresponding to the external apparatus based on the first sound and the relative location pattern of the external apparatuses corresponding to the electronic apparatus even though a user location detecting sensor is not installed therein and the location of the external apparatus is not previously set up.

The electronic apparatus according to the disclosure can estimate a location of a moving object through the surrounding external apparatuses which allows a sound input/output, e.g., which is provided with the microphone and the loudspeaker, or the microphone and the interface portion.

While the disclosure has been illustrated and described with reference to various example embodiments, it will be understood that the various example embodiments are intended to be illustrative, not limiting. It will be further understood by one of ordinary skill in that art that various modifications can be made without departing from the true spirit and full scope of the disclosure, including the appended claims and their equivalents.

What is claimed is:

1. An electronic apparatus comprising:
   a sound output unit including sound output circuitry; and
   a processor configured to:
      obtain first sound information from an external apparatus that receives a first sound output from the sound output unit,
      obtain second sound information from the external apparatus that receives a second sound output from an object, and
      identify locations of the electronic apparatus and the object with respect to the external apparatus based on a first signal characteristic and a second signal characteristic respectively detected using the obtained first sound information and second sound information.

2. The electronic apparatus according to claim 1, wherein the external apparatus comprises a plurality of external apparatuses.

3. The electronic apparatus according to claim 2, wherein one of the plurality of external apparatuses is configured to obtain the second sound information of the object from other external apparatuses.

4. The electronic apparatus according to claim 1, wherein the processor is configured to: detect a location pattern of the object or the external apparatus based on at least one of loudness, response time, a noise level or a noise frequency of the first sound or the second sound.

5. The electronic apparatus according to claim 1, wherein the first sound information and the second sound information comprise identification information of the external apparatus.

6. The electronic apparatus according to claim 5, wherein the identification information of the external apparatus comprises at least one of identification (ID) of the external apparatus, a name of the external apparatus, an inaudible frequency assigned to the external apparatus, or a noise frequency.

7. The electronic apparatus according to claim 1, wherein the second sound information comprises an inaudible band signal output from the external apparatus by converting the second sound output from the object.

8. The electronic apparatus according to claim 1, wherein the processor is configured to output the first sound based on an inaudible band of a sound output from the sound output.

9. The electronic apparatus according to claim 8, wherein the processor is configured to generate a band having a frequency having a largest difference from an audible frequency within a usable inaudible band.

10. The electronic apparatus according to claim 8, wherein the processor is configured to change the signal characteristic of the first sound based on the location of the object.

11. The electronic apparatus according to claim 1, wherein the processor is configured to control an operation of the external apparatus based on the location of the object.

12. A method of controlling an electronic apparatus, comprising:
- obtaining first sound information from an external apparatus that receives a first sound output from an object;
- outputting a second sound;
- obtaining second sound information from the external apparatus that receives the output second sound; and
- identifying locations of the electronic apparatus and the object with respect to the external apparatus based on a first signal characteristic and a second signal characteristic respectively detected using the obtained first sound information and second sound information.

13. The method according to claim 12, wherein the external apparatus comprises a plurality of external apparatuses.

14. The method according to claim 13, wherein one of the plurality of external apparatuses obtains the first sound information of the object from other external apparatuses.

15. The method according to claim 12, wherein a location pattern of the object or the external apparatus is detected based on at least one of loudness, response time, a noise level or a noise frequency of the first sound or second sound.

16. The method according to claim 12, wherein the first sound information and the second sound information comprise identification information of the external apparatuses.

17. The method according to claim 16, wherein the identification information of the external apparatus comprises at least one of identification (ID) of the external apparatus, a name of the external apparatus, an inaudible frequency assigned to the external apparatus, or a noise frequency.

18. The method according to claim 12, wherein the first sound information comprises an inaudible band signal output from the external apparatus by converting the first sound output from the object.

19. The method according to claim 12, wherein the outputting the second sound comprises outputting the second sound based on an inaudible band of a sound output from a sound output.

20. The method according to claim 19, wherein the second sound is output in a band having a frequency having a largest difference from an audible frequency within a usable inaudible band.

* * * * *